United States Patent
Finkam et al.

(10) Patent No.: US 7,891,573 B2
(45) Date of Patent: Feb. 22, 2011

(54) METHODS AND APPARATUSES FOR CONTROLLING AIR TO A BUILDING

(75) Inventors: Joseph E. Finkam, Indianapolis, IN (US); Eric M. Pratt, Lebanon, IN (US)

(73) Assignee: Micro Metl Corporation, Indianapolis, IN (US)

( * ) Notice: Subject to any disclaimer, the term of this patent is extended or adjusted under 35 U.S.C. 154(b) by 990 days.

(21) Appl. No.: 11/682,198

(22) Filed: Mar. 5, 2007

(65) Prior Publication Data
US 2007/0205297 A1 Sep. 6, 2007

Related U.S. Application Data

(60) Provisional application No. 60/779,251, filed on Mar. 3, 2006.

(51) Int. Cl.
*F24F 7/00* (2006.01)
*F24F 11/053* (2006.01)
*G05D 23/12* (2006.01)
*G01M 1/38* (2006.01)

(52) U.S. Cl. ............... 236/49.3; 236/1 C; 700/276
(58) Field of Classification Search ............. 236/1 C, 236/49.3, 78 D; 700/275, 276, 277; 703/2
See application file for complete search history.

(56) References Cited

U.S. PATENT DOCUMENTS

| | | | |
|---|---|---|---|
| 4,527,734 A | | 7/1985 | Swain et al. |
| 5,071,065 A | | 12/1991 | Aalto et al. |
| 5,292,280 A | | 3/1994 | Janu et al. |
| 5,479,812 A | * | 1/1996 | Juntunen et al. ............. 73/1.34 |
| 5,597,354 A | | 1/1997 | Janu et al. |
| 5,742,516 A | | 4/1998 | Olcerst |
| 6,006,142 A | | 12/1999 | Seem et al. |
| 6,079,627 A | | 6/2000 | Kettler |
| 6,219,590 B1 | | 4/2001 | Bernaden, III et al. |
| 6,227,961 B1 | | 5/2001 | Moore et al. |
| 6,415,617 B1 | | 7/2002 | Seem |
| 6,430,985 B1 | * | 8/2002 | Drees ......................... 73/1.34 |
| 6,463,397 B1 | | 10/2002 | Cohen et al. |

(Continued)

FOREIGN PATENT DOCUMENTS

JP 04208350 A * 7/1992

(Continued)

*Primary Examiner*—Chen-Wen Jiang
(74) *Attorney, Agent, or Firm*—Woodard, Emhardt, Moriarty, McNett & Henry, LLP

(57) ABSTRACT

HVAC systems, including various HVAC system components, and methods for manufacturing the same are disclosed for controlling airflow into a building. Embodiments of the HVAC systems include apparatuses for controlling the volumetric airflow moving through at least one HVAC system component using a measurement device, for example an airflow detector, a regulator, for example a damper or blower, and a controller, where the controller receives input from the measurement device, manipulates the input with a control algorithm, and sends output commands to the regulator. Further embodiments include apparatuses and methods for development of the control algorithm by testing a similar HVAC system component, measuring the actual volumetric airflow through the HVAC system component, and comparing the actual volumetric airflow with the airflow measured by the measurement device. Still further embodiment include forming a plurality of similar HVAC components that each control airflow without requiring further testing.

22 Claims, 17 Drawing Sheets

U.S. PATENT DOCUMENTS

| | | |
|---|---|---|
| 6,549,826 B1 | 4/2003 | Pouchak et al. |
| 6,554,198 B1 | 4/2003 | Hull et al. |
| 6,634,422 B2 | 10/2003 | Rayburn et al. |
| 6,715,690 B2 | 4/2004 | Hull et al. |
| 6,732,540 B2 | 5/2004 | Sugihara et al. |
| 6,778,945 B2 | 8/2004 | Chassin et al. |
| 6,859,685 B2 | 2/2005 | Coogan |
| 6,916,239 B2 | 7/2005 | Siddaramanna et al. |
| 6,923,072 B2 | 8/2005 | Modera et al. |
| 6,986,469 B2 | 1/2006 | Gauthier et al. |
| 6,993,414 B2 | 1/2006 | Shah |
| 7,024,258 B2 | 4/2006 | Ahmed et al. |
| 2001/0007337 A1 | 7/2001 | Buchholz |
| 2004/0015248 A1 | 1/2004 | Tanaka |
| 2004/0064204 A1 | 4/2004 | Frutiger |
| 2004/0144849 A1 | 7/2004 | Ahmed |
| 2004/0158359 A1 | 8/2004 | Frecska et al. |
| 2004/0186599 A1 | 9/2004 | Ahmed et al. |
| 2004/0222884 A1 | 11/2004 | Costa et al. |
| 2004/0256473 A1 | 12/2004 | Hull et al. |
| 2005/0006488 A1 | 1/2005 | Stanimirovic |
| 2005/0118078 A1 | 6/2005 | Dobbs et al. |
| 2005/0119766 A1 | 6/2005 | Amundson et al. |
| 2005/0145191 A1 | 7/2005 | Cohen et al. |
| 2005/0187664 A1 | 8/2005 | Bash et al. |
| 2005/0224591 A1* | 10/2005 | Wolfson .................... 236/49.3 |
| 2005/0241325 A1 | 11/2005 | Olney |
| 2005/0278071 A1 | 12/2005 | Durham, III |
| 2006/0042277 A1 | 3/2006 | Sadegh et al. |
| 2006/0058924 A1 | 3/2006 | Shah |
| 2006/0117769 A1 | 6/2006 | Helt et al. |

FOREIGN PATENT DOCUMENTS

| | | |
|---|---|---|
| WO | WO 2005/062142 A1 | 11/2004 |
| WO | WO 2005/103576 A2 | 4/2005 |

* cited by examiner

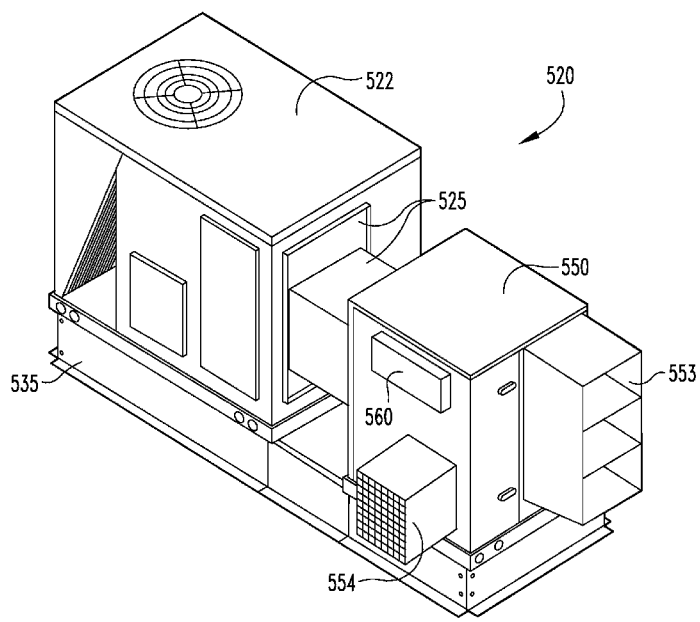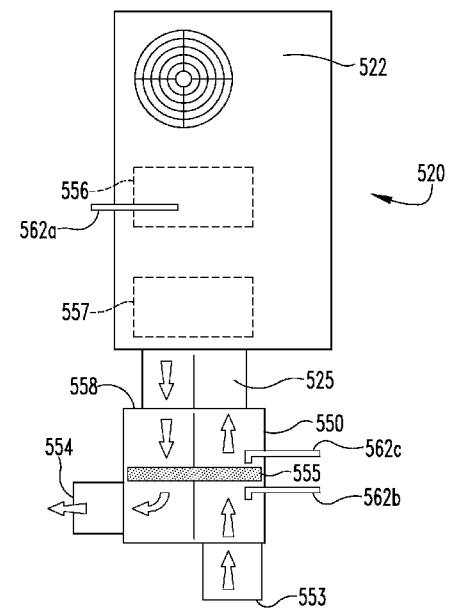
Fig. 5   Fig. 6

METHODS AND APPARATUSES FOR CONTROLLING AIR TO A BUILDING

This application claims the benefit of U.S. Provisional Application No. 60/779,251, filed Mar. 3, 2006, the entirety of which are hereby incorporated herein by reference.

FIELD

Embodiments of the present invention pertain to methods and apparatuses for controlling the heating, ventilating, and air conditioning of a building, and in particular, to such systems which provide controlled amounts of air to the building

BACKGROUND

Heating, ventilating, and air conditioning (HVAC) systems are commonly used to ventilate enclosed spaces in structures, for example rooms in a building, and in particular those rooms occupied by people. Typically HVAC systems use ducting and at least one blower to deliver outside air to the interior spaces. Typical HVAC systems include blowers that operate at a constant RPM or output, and use dampers to control the airflow, frequently expressed as a volumetric airflow rate measured in cubic feet per minute, into a building. Although the blower may be located in various locations, commercial applications frequently use rooftop units with the blower located on the building's roof.

Many HVAC systems use one or more additional components in conjunction with the blower and ducting. For example, powered exhausts are used with HVAC systems to forcibly draw return air out of the building. Filters are also used frequently to remove certain components, such as dust, from the air. Dampers may also be used at various locations throughout the HVAC system to control the amount of air circulating in the system as a whole or in a portion of the system, such as in a particular room.

Economizers can be used to mix return air with incoming outside air to conserve energy and decrease operating costs. By mixing the return air with the incoming outside air, the incoming outside air is either pre-heated or pre-cooled, as appropriate, which decreases the energy required to heat or cool the air to the desired interior temperature. For example, when the outside air temperature is below the desired interior temperature, the HVAC system heats the incoming outside air and exhausts the warm return air outside the building. By using an economizer, the warm return air is mixed with and pre-heats the incoming outside air, thereby reducing the energy required to heat the mixed outside and return air to the desired temperature. However, the amount of return air that is mixed with the incoming outside air is frequently limited to limit the levels of harmful compounds in the building, such as $CO_2$ or various organic compounds, thereby limiting the energy savings that may be realized with an economizer.

Energy recovery ventilators (ERVs) are also used with HVAC systems. The ERV is a heat exchanger that, similar to the economizer, either pre-heats or pre-cools the incoming outside air, as appropriate. However, in contrast with the economizer, an ERV mixes relatively little return air with the incoming outside air. One type of ERV uses a rotating disk arranged perpendicular to and bisecting two ducts, one duct for incoming outside air and the other duct for return air. The material in the rotating disk collects thermal energy from the duct with the warmer air and releases at least a portion of the collected thermal energy to the duct with the cooler air while minimizing mixing of the two airflows. Depending on the material used in the disk, some ERVs are also capable of transferring moisture (humidity) between the two ducts. HVAC systems must comply with various government and regulatory standards. One set of widely used standards are promulgated by the American Society of Heating, Refrigerating and Air-Conditioning Engineers, Inc. (ASHRAE). These standards require a particular volumetric airflow rate of outside air entering a building for each building occupant, frequently measured in cubic feet per minute (c.f.m.). Current standards require a minimum of fifteen (15) cubic feet per minute of airflow entering a building for each occupant of the building.

After typical HVAC systems are installed in a building, trained technicians are required to "balance" the HVAC system. To balance a newly installed HVAC system, the technician determines the airflow required through a building's duct work by traversing or similar testing procedure and adjusts the airflow based on existing conditions. However, miscalculations, such as miscalculations of static pressure in the return air systems, can lead to improper airflow determinations. Additionally, the testing procedures typically fail to take into account overall system effect, such as the impact one airflow apparatus has on another airflow apparatus. Frequently, the overall system effect cannot be properly calculated when testing and balancing the entire system. For example, HVAC system components or subcomponents that operate intermittently during normal operation may be either continually on or continually off during the testing and balancing procedure. Furthermore, clogged filters, dirty ducts, and blower inefficiency due to long-term wear can degrade airflow through the duct work and result in the HVAC system delivering non-optimal airflow as the system ages.

Still other problems with prior HVAC systems include their inability to dynamically control the actual airflow entering a building. Since typical HVAC systems can not adjust airflow in response to, for example, actual building occupancy or $CO_2$ levels, the actual "as installed" output of the HVAC system must be measured and set by the trained technician for an assumed building occupancy, which introduces additional errors and inefficiencies. For example, an installed HVAC system blower is typically set to deliver a high airflow rate sufficient to condition the building's interior when at or near a maximum expected occupancy during working hours, and reset to deliver a much lower airflow rate during non-working hours. Although this type of system maintains adequate airflow under normal conditions, under conditions where the actual occupancy differs from the estimated occupancy the actual airflow is either too high or too low. When the airflow is lower than required for existing conditions, the concentration of $CO_2$ or other compounds may increase to unacceptable or dangerous levels. When occupancy is below projected levels, the HVAC system is inefficient, moving more air than required and consuming more energy than necessary.

Some HVAC systems have been developed to control the airflow entering buildings. However, these systems do not accurately control volumetric airflow or are very large, expensive, and require large amounts of roof space. The larger systems use long flow straighteners to achieve laminar airflow and accurately measure the airflow entering a building.

Other systems typically use pressure transducers in conjunction with variable opening dampers to control airflow. In these types of systems, the opening of the variable opening damper is adjusted to achieve a particular pressure as indicated by the pressure transducer, which approximates a particular airflow. However, these systems are based on assumptions and approximations that cause the system to be unreliable for accurate control of the airflow. For example, these systems incorrectly assume a laminar flow pattern through the damper and in the vicinity of the pressure transducer, which introduces control inaccuracies that increase as the damper closes and the amount of turbulent airflow increases. Furthermore, these systems approximate the relationship between the damper opening and the volume of air flowing through the damper as a linear relationship, which introduces additional control inaccuracies that also increase as the damper closes.

Consequently, there is a need for improved methods and apparatuses for providing and controlling the ambient air delivered to a building by an HVAC system.

Certain features of embodiments of the present invention address these and other needs and provide other important advantages.

Some or all of these features may be present in the independent or dependent claims which follow herein, but should not be construed to be a limitation unless expressly recited in a particular claim.

SUMMARY

It is an object of embodiments of the present invention to provide improved methods and apparatuses for providing ambient air to a building.

In accordance with a first aspect of an embodiment of the present invention, a method for manufacturing at least one HVAC component for connection to a building's HVAC system with HVAC ducting, where the HVAC component receives input from a user input and controls the airflow entering the building's HVAC system is disclosed. The method includes the act of providing a first HVAC component, the HVAC component including a first housing with a first airflow passage configured and adapted to connect to the HVAC ducting installed in a building with the first airflow passage in fluid communication with the HVAC ducting; a first airflow detector for measuring the volume of air passing through the first airflow passage; a first airflow regulator for regulating the airflow through the first airflow passage; and a first controller with a memory, the first controller configured and adapted to command the airflow regulator to change the amount of air moving through the first airflow passage. The method also includes the acts of attaching the first airflow detector to the first housing at a first location, where the attaching places the first airflow detector in the first airflow passage; moving air through the first airflow passage; obtaining a measured airflow by measuring the airflow through the first airflow passage with the first airflow detector; obtaining an actual volumetric airflow by determining the airflow through the first airflow passage with a calibrated test system; and determining a correction to convert the measured airflow to the actual airflow. The method further includes the act of applying the correction to the first controller and, while the first controller is in communication with the first airflow regulator and the first airflow regulator is attached to the first housing, causing the controller to: a) command an increase in the first airflow regulator output when the actual airflow is below a desired airflow, b) command a decrease in the first airflow regulator output when the actual airflow is above a desired airflow, and c) maintain a constant first airflow regulator output when the actual airflow equals a desired airflow.

In accordance with an aspect of another embodiment of the present invention, a plurality of HVAC systems is provided, each system with at least one HVAC component for controlling the volumetric airflow through the HVAC system, each of the plurality of HVAC system components being substantially similar to one another, at least one of the HVAC system components comprising a first HVAC component. The first HVAC component includes: a first housing with a first airflow passage configured and adapted to connect to one of the HVAC system's ducting with the first airflow passage in fluid communication with the HVAC system's ducting; a first airflow regulator for changing the airflow through the airflow passage; a first airflow detector for measuring the airflow passing through the first airflow passage; and a first controller with a memory, the first controller connected to the first airflow regulator and the first airflow detector, where the first controller commands the first airflow regulator to change the airflow rate through the first airflow passage to achieve a desired actual airflow rate using a control algorithm. The HVAC component further comprising means for deriving the control algorithm including means for measuring the actual airflow through the first HVAC system component, where the control algorithm converts input from the first airflow detector to an actual airflow rate through the first HVAC system component, and where the control algorithm compares the actual airflow rate to a desired airflow rate.

In accordance with an aspect of still another embodiment of the present invention, an HVAC system component for attachment to a building's HVAC system and for controlling the airflow through the HVAC system component is provided. The component comprising: a housing defining an airflow passage; an airflow detector for detecting the airflow through the airflow passage, the airflow detector attached to the housing and located at a first position in the airflow passage; an airflow regulator attached to the housing and configured to regulate the airflow through the airflow passage; and a controller in communication with the airflow detector and the airflow regulator, where the controller receives input from the airflow detector and calculates a command using a control algorithm. Additionally, the controller commands the airflow regulator to: increase airflow through the airflow passage when the actual airflow through the airflow passage is less than a desired airflow; decrease airflow through the airflow passage when the actual airflow through the airflow passage is greater than a desired airflow; and maintain the airflow rate through the airflow passage when the actual airflow through the airflow passage equals a desired airflow. Additionally, the airflow regulator receives the controller command and correspondingly changes the airflow through the airflow passage. Furthermore, the control algorithm is derived by testing a test-component, the test-component including: a test-housing similar to the housing and defining a test-airflow-passage similar to the airflow passage; a test-detector similar to the airflow detector for detecting the airflow through the test-airflow-passage, the test-detector attached to the test-housing at a position in the test-airflow-passage similar to the first position; and a test-regulator similar to the airflow regulator and attached to the test-housing, the test-regulator configured to regulate the airflow through the test-airflow passage. The control algorithm is further derived by comparing the actual volumetric airflow through the test-airflow-passage to the airflow measured by the test-detector.

Further objects, features and advantages of embodiments of the present invention shall become apparent from the detailed drawings and descriptions provided herein.

Each embodiment described herein is not intended to address every object described herein, and each embodiment does not include each feature described.

BRIEF DESCRIPTION OF THE DRAWINGS

FIG. 5 is a perspective view of an HVAC rooftop unit according to another embodiment of the present invention.

FIG. 6 is a top, schematic representation of the rooftop HVAC unit and economizer of FIG. 5.

DETAILED DESCRIPTION OF THE ILLUSTRATED EMBODIMENTS

Figure 1A:
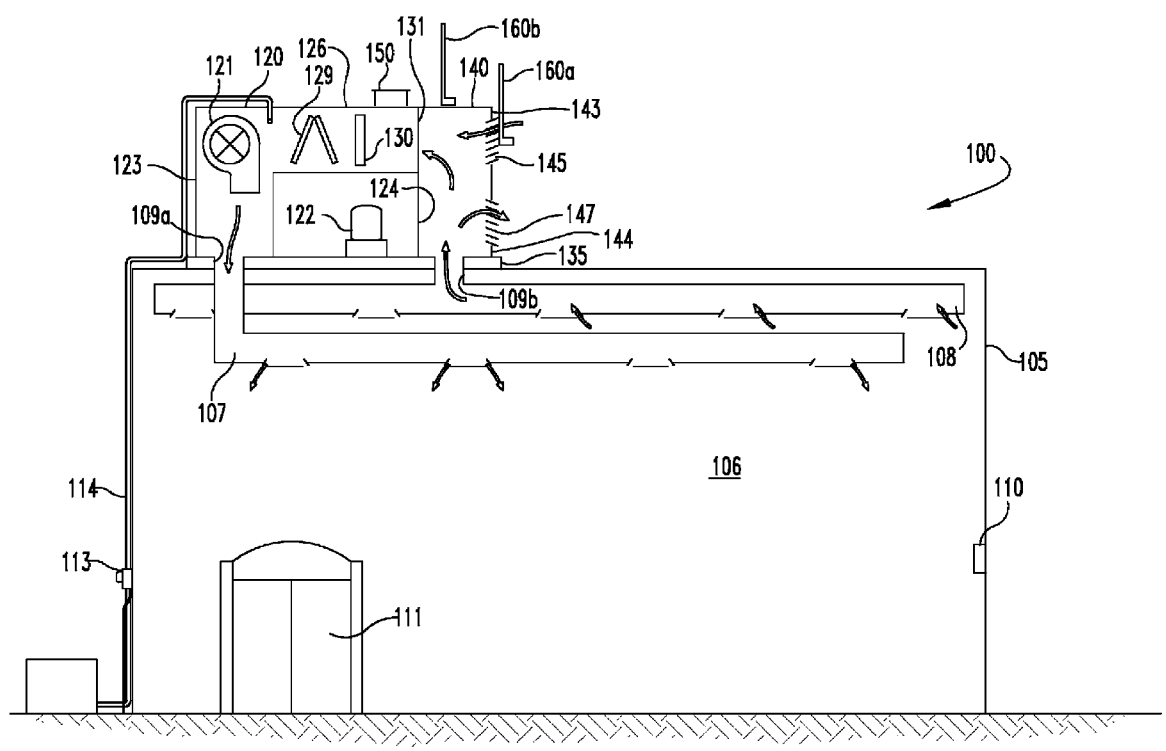
FIG. 1A is a schematic representation of a building with an HVAC system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Embodiments of the present invention self-adjust to the dynamics of the space to be conditioned. The disclosed methods and/or apparatuses adjust to perturbations in the airflow, whether of short or long duration, to return the airflow to a desired state. The desired state can include preselected values of airflow, as measured in cubic feet per minute and/or pressure. The self-adjustment of the HVAC unit eliminates the need to "balance" the HVAC system after initial installation or after an additional apparatus, such as a powered exhaust, ERV, or similar apparatus, is later installed.

FIG. 1A is a schematic representation of a building having an air control system 100 according to one embodiment of the present invention. Air control system 100 is a constant air volume system, although alternate embodiments use a variable air volume HVAC system. Building 105 includes an interior airspace 106 which is provided conditioned air from a plurality of building supply ducts 107 or the like. A plurality of building return ducts 108 or the like remove air from interior airspace 106. Conditioned air is provided into building supply duct 107 through a supply rooftop opening 109a, and return air is removed from interior airspace 106 through a return rooftop opening 109b.

Occupants of the building can control various characteristics of interior airspace 106 through an occupant control 110. For example, occupants can set a desired volumetric airflow rate of outside air entering the building 105, which may be set in cubic feet per minute, a desired amount of $CO_2$, a desired amount of tobacco smoke, or a desired amount of one or more volatile organic or other types of detectable compounds, and the air control system 100 will automatically adjust its operation, such as automatically adjust the volumetric airflow of outside air through inlet 131 and/or the volumetric airflow through HVAC supply duct 123, to control the particular characteristic or characteristics.

Interior airspace 106 is generally maintained at a pressure slightly above ambient conditions, which results in the interior air leaking out through various openings, such as door 111. In alternate embodiments, the pressure in interior airspace 106 is maintained at or below ambient conditions and the exterior air leaks in through any openings that may be present.

Placed on the roof of building 105 is an HVAC unit, for example, HVAC rooftop unit 120, which includes an airflow housing with an airflow passage, such as duct 126, and various HVAC system components, such as an economizer 140, a heat exchanger 129 and a blower 121. Economizer 140 provides air to the HVAC rooftop unit 120. HVAC rooftop unit 120 is mounted to a curb 135. Curb 135 attaches on one side to the HVAC supply duct 123 and to inlet 143 and/or outlet 144 of economizer 140. Curb 135 is connected on the other side to the rooftop and to the supply rooftop opening 109a and the return rooftop opening 109b.

In the depicted embodiment, HVAC rooftop unit 120 includes an inlet 131 which provides air to an internal air filter 130. Filtered air is then passed over the heat exchanger 129, which either cools or heats the air. An airflow regulator for manipulating the flow of air, for example blower 121, takes air from heat exchanger 129 and provides it through HVAC supply duct 123, through curb 135, through supply rooftop opening 109a, and into building supply duct 107. The blower 121 operates at a constant speed, as measured in revolutions per minute; however, in alternate embodiments, the speed of blower 121 varies during operation provided an adequate amount of air is supplied to building 105, and an adequate amount of air flows past heat exchanger 129 to prevent heat exchanger 129 from overheating or forming ice. A motor, for example compressor motor 122, circulates cooling fluid through heat exchanger 129. The building's electrical supply 113 provides electrical power to blower 121, motor 122 and inlet louvers 142, as well as other electric and electronic components. A supply 114 of natural gas or electricity acts as a source of heat for heat exchanger 129.

The economizer 140 provides exhaust, inlet, and mixing functions. Return air from duct 108 either exits through the economizer outlet louvers 147 or bypasses outlet louvers 147 and mixes with incoming air provided through economizer inlet louvers 145, which is thereafter provided into the inlet 131.

A controller, for example electronic controller 150, takes a variety of sensory and command inputs from, for example, a measurement device, such as flow sensors 160a and 160b, and sends commands to various HVAC components, such as inlet louvers 145, outlet louvers 147, heat exchanger 129, motor 122 and blower 121. The term "actuator" as used herein is any device which receives an input signal or command from the controller and produces a mechanical output. Non-limiting examples of actuators include linear actuators, rotary actuators, electromechanical actuators, pneumatic actuators, variable frequency drives, and stepper motors. Controller 150 is a digital electronic controller, although in alternate embodiments the controller can also be an analog electronic controller, fluidic controller, or any other kind of means for processing a variety of inputs and operating a variety of actuators.

In use, an occupant of building 105 adjusts occupant control 110 to control a desired characteristic of interior air space 106, for example, the volumetric airflow rate of outside air entering the building 105 and the interior air space 106 as set in cubic feet per minute. Electronic controller 150 receives sensory input from flow sensors 160a and 160b (referred to as the "measured" airflow) and determines the actual volumetric airflow rate of outside air entering building 105. Electronic controller 150 compares the actual volumetric airflow rate of outside air entering building 105 to the desired volumetric airflow rate received from occupant control 110 and adjusts the airflow regulator—adjusts inlet louvers 145 in the illustrated embodiment—until the desired volumetric airflow rate, also referred to as commanded volumetric airflow rate of outside air entering the building, is achieved.

Flow sensor 160a detects a characteristic of air entering inlet 143, for example static air pressure, and transmits this information to controller 150. Flow sensor 160b senses a characteristic, for example static pressure, of the outside (ambient) air. Both flow sensors 160a and 160b are located on the same "side" of the flow regulator—inlet louvers 145 in the illustrated embodiment. Controller 150 compares the signals received from flow sensors 160a and 160b and calculates the air flow passing through inlet 143 and inlet louvers 145. Both flow sensors 160a and 160b are located "upstream" of inlet 143—the pressures measured by flow sensors 160a and 160b are both for air that has not passed through inlet 143. Flow sensor 160a is located in close proximity to inlet louvers 145 while flow sensor 160b is located away from inlet louvers 145 to provide an indication of ambient pressure. With air traveling through inlet louvers 145, there is a difference in the pressure sensed by flow sensors 160a and 160b, which is indicative of the airflow through inlet 143. As such, a user is able to set and have the HVAC system deliver a specific volumetric airflow rate of outside air entering the building. The relative location of flow sensors 160a and 160b to inlet 143 allows flow sensors 160a and 160b to detect various abnormal situations within HVAC rooftop unit 120, for example, a clogged filter 130, an iced-over heat exchanger 129, or a degraded output of blower 121. As an example, an indication that there is abnormal airflow through HVAC rooftop unit 120 occurs when inlet louvers 145 are opened and the pressures sensed by flow sensors 160a and 160b are equal.

Various types of control schemes may be used that adjust the airflow regulator to provide the desired airflow, for example, a closed-loop type feedback control, such as a PID control, is frequently used to adjust the output of blower 121 to achieve the commanded volumetric airflow rate. The actual airflow is calculated and commands are sent to the airflow regulator at various rates. In particular, the actual airflow is calculated and commands are sent to the airflow regulator at least one (1) time and at most eighty (80) times per second. More particularly, the actual airflow is calculated and commands are sent to the airflow regulator at least twenty (20) and at most sixty (60) times per second. Even more particularly, the actual airflow is calculated and commands are sent to the airflow regulator approximately forty (40) times per second.

Although controller 150 of air control system 100 is described as controlling the airflow through inlet 143 and inlet louvers 145, alternate embodiments of the present invention include controller 150 controlling the operation of one or more HVAC components, for example, blowers, including blower 121, dampers, economizers, energy recovery ventilators (ERVs) and powered exhausts. For example, in an alternate embodiment flow sensors can be located either upstream or downstream of a powered exhaust attached to HVAC rooftop unit 120. These flow sensors can be used control the airflow through the powered exhaust fans to maintain a particular overpressure inside building 105.

In still another example embodiment, flow sensors can be located in duct 126 to monitor and control the output of blower 121.

As yet another example, in an alternate embodiment of the present invention, an occupant of building 105 can use occupant control 110 to command a desired temperature in interior air space 106. Electronic controller 150 receives the temperature command input from occupant control 110 and adjusts the heat exchanger 129 and the economizer 140 to set and maintain the temperature of interior air space 106 at the commanded temperature.

Still other example embodiments allow the heat exchanger 129 to work in conjunction with an energy recovery ventiltator (ERV), or similar, by controlling the ERV system to optimize the sensible and/or latent conditions entering the rooftop unit.

Although embodiments of the present invention include an entire HVAC system with one or more controllers and one or more flow sensors, for example, the embodiment depicted in FIG. 1A, alternate embodiments include individual HVAC components, such as economizer, ERV, powered exhaust, damper, heat exchanger or blower, with integrated controllers and flow sensors.

Figure 1B:
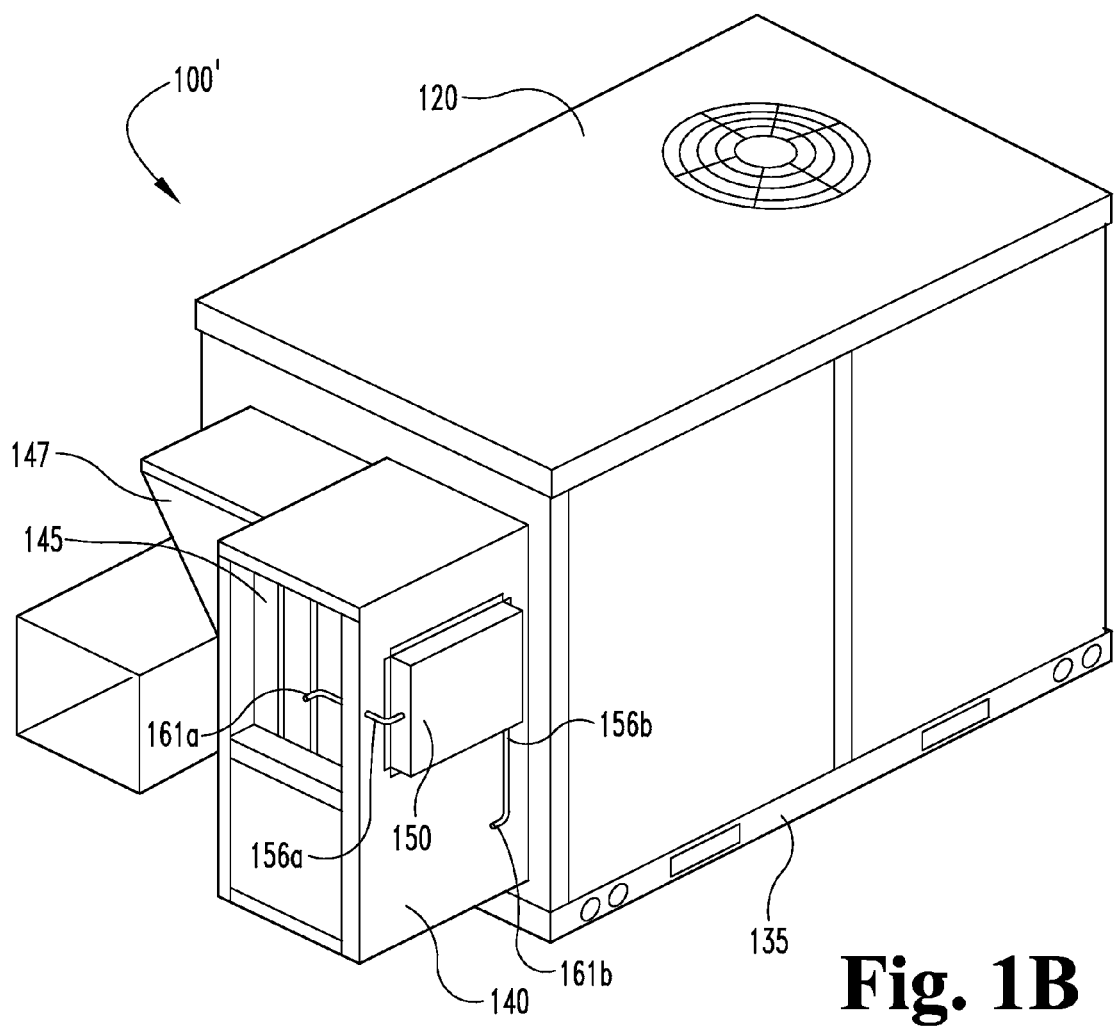
FIG. 1B is a perspective view of an HVAC system and economizer generally represented by the schematic of FIG. 1A.

FIG. 1B is a perspective view of an example airflow control system 100' generally represented by the schematic of FIG. 1A. Airflow control system 100 has been previously tested in flow measurement and calibration system 400 (See FIG. 4). HVAC rooftop unit 120 preferably includes a pair of static pressure probes 161a and 161b, which measure differential pressures within the incoming airflow of HVAC rooftop unit 120. Preferably, probe 161a is located upstream of inlet louvers 145 and probe 161b is located where it can measure the ambient pressure of the outside air. Both of these pressure probes are in communication with controller 150. Preferably, each probe has either a differential pressure transducer, or two pressure transducers, located within the housing of HVAC unit 120, which are in electrical communication with controller 150 via, for example, electrical conduits 156a and 156b. In alternate embodiments, the two pressures are taken directly through external tubing, for example tubing similar in appearance to electrical conduits 156a and 156b, to pressure transducers within control 150.

Figure 2:
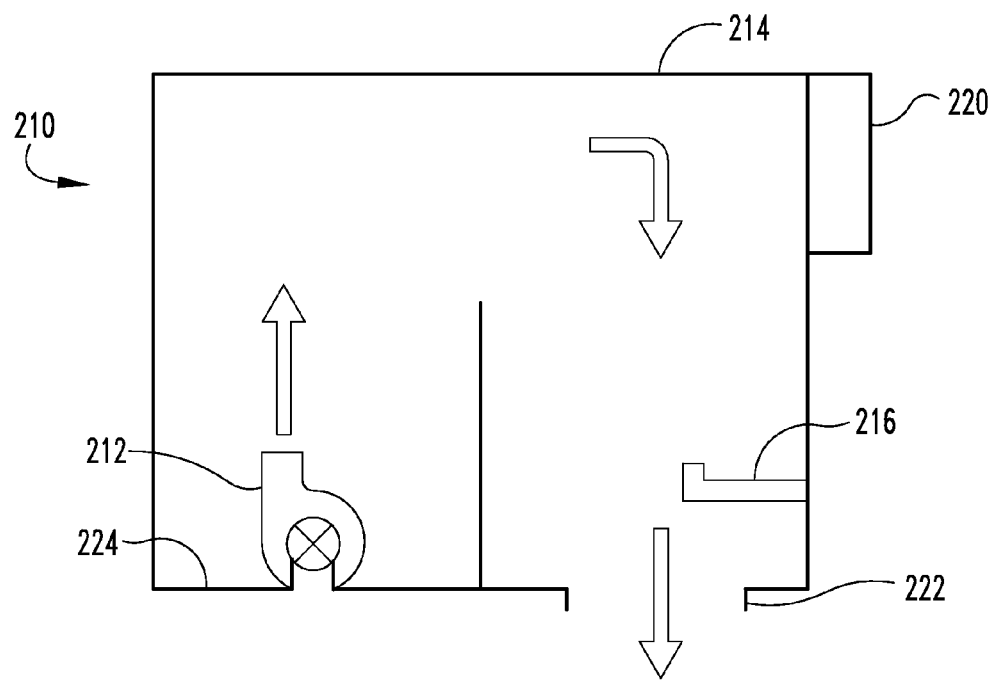
FIG. 2 is a schematic representation of an HVAC system blower component according to yet another embodiment of the present invention.

Depicted in FIG. 2 is an example HVAC component 210 used to control the airflow delivered to a building. HVAC component 210 includes an airflow regulator, for example blower 212, an airflow housing with an airflow passage, for example duct 214, a measurement device, for example an airflow detector such as static pressure sensor 216, and a controller 220. In alternate embodiments, the airflow regulator is a damper, for example a louvered damper. In still other embodiments, the measuring device includes, for example, a temperature sensor, humidity sensor, CO detector, $CO_2$ detector, volatile organic compound detector, static pressure port, total pressure port, and hot wire anemometers, including those using polymers.

Duct 214 includes a building supply opening 222, which connects to the building's supply duct. Although the embodiment depicted in FIG. 2 has a measurement device located in the vicinity of the building supply opening 222, alternate embodiments may place the measurement device at alternate locations to control various aspects of the HVAC system. For example, a measurement device may be located in the proximity of an ERV to control the operation of the ERV. As such, duct 214 in alternate embodiments may not include a building supply opening 222, and may instead connect to another HVAC system component.

Figure 3:
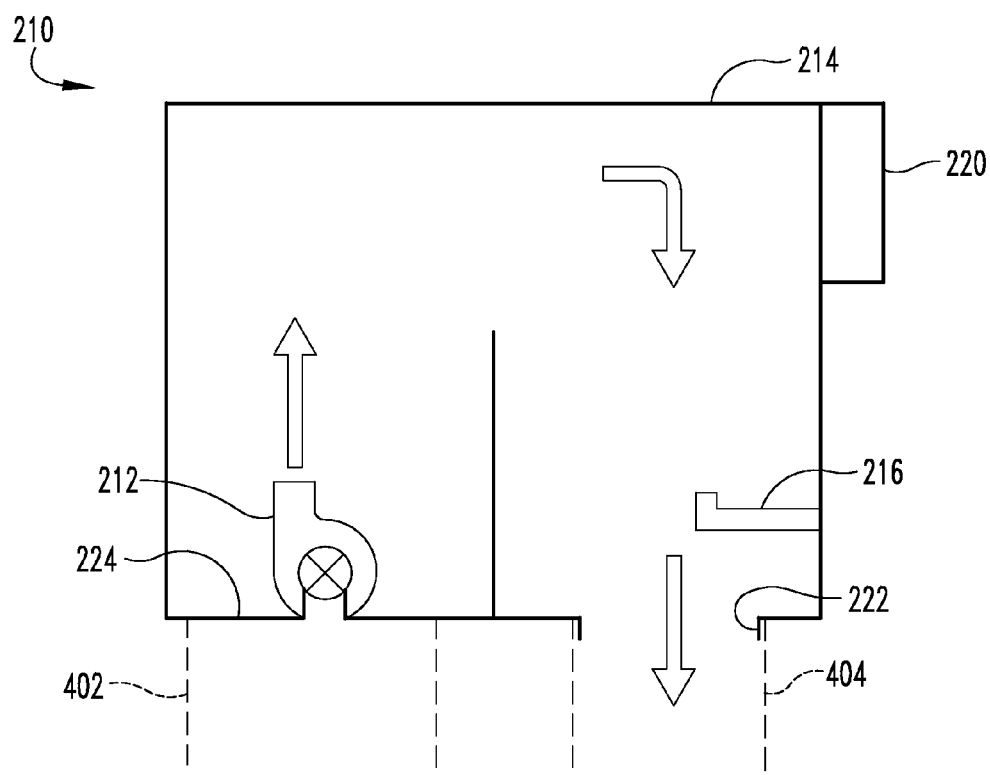
FIG. 3 is a schematic representation of the HVAC component of FIG. 2 attached to a flow measurement calibration system.
Figure 4:
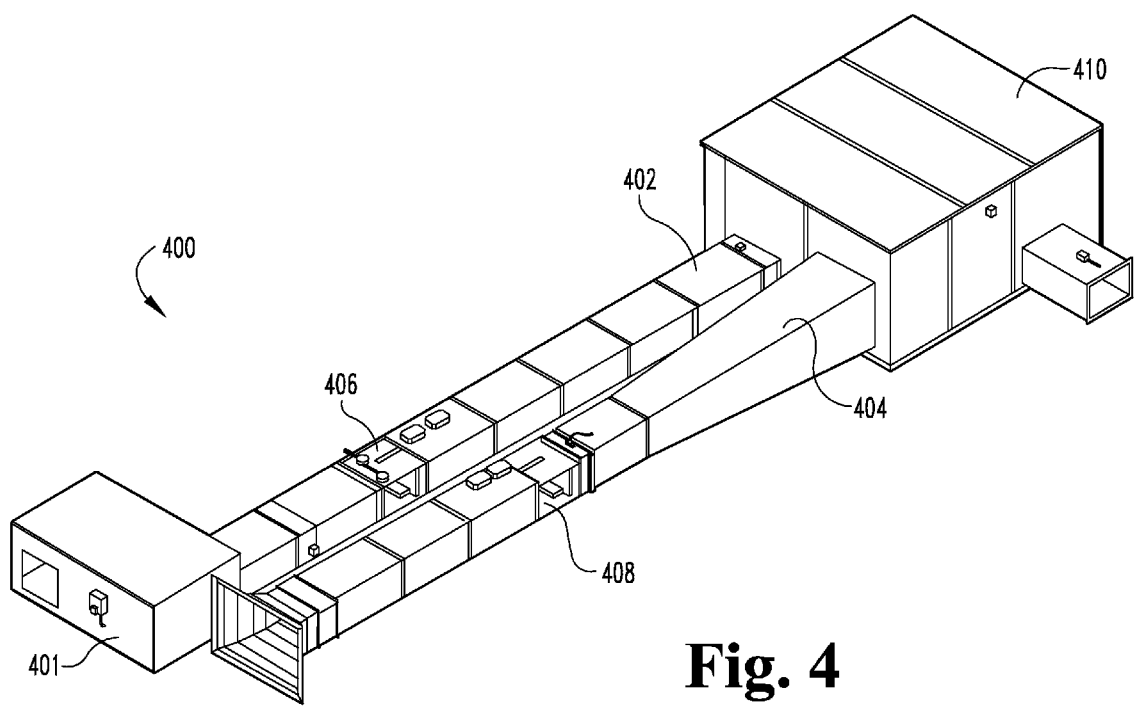
FIG. 4 is a perspective view of a flow measurement calibration system according to one embodiment of the present invention.

FIG. 3 depicts HVAC component 210 connected to a flow measurement calibration system for testing, for example, the flow measurement calibration system 400 depicted in FIG. 4. Transitional input duct 402 attaches to and is in fluid communication with the blower attachment portion 224. Transitional output duct 404 attaches to and is in fluid communication with building supply opening 222. As used herein, the term "fluid communication" includes communication by the flow of gasses between two objects, for example, the flow of air between two HVAC system components.

Typically, the output of the measurement device ("measured airflow") does not accurately reflect the actual airflow through the airflow passage adjacent the measurement device. As an illustrative example, an incremental increase in the output of pressure sensor 216 does not typically indicate that the actual volumetric airflow through duct 214 has increased by the same incremental amount. The type of measurement device, the shape of the airflow passage, and the location of the measurement device in the airflow passage, for example, affect the relationship between the measurement device output and the actual airflow. To determine the actual volumetric airflow through an HVAC component, the HVAC component (or an HVAC test-component with substantially similar airflow characteristics to the HVAC component) is attached to a system or device that can accurately measure the actual volumetric airflow ("actual airflow") through the HVAC component, such as flow measurement calibration system 400 (see FIG. 4).

During testing with flow measurement calibration system 400, the measured airflow through HVAC component 210, as indicated by static pressure sensor 216, is compared to the actual airflow at various airflow rates. From this comparison, the relationship between the actual airflow and the measured airflow through HVAC component 210 is determined. Using this comparison, the output of static pressure sensor 216 in pounds per square inch is readily converted to an actual airflow rate in cubic feet per minute, by way of nonlimiting example. A control algorithm for controller 220 is derived from the relationship between the actual airflow and the measured airflow. The control algorithm is programmed into controller 220, which then controls the output of blower 212 in HVAC component 210. A plurality of HVAC components 210 may then be produced and attached to building HVAC systems, with each individual HVAC component 210 controlling the airflow through itself.

In alternate embodiments where the airflow regulator is a blower, development of control algorithms includes the use of the AMCA fan curve for the particular model blower used in the HVAC system. With the AMCA fan curve, the actual airflow produced by the blower is calculated as a function of blower r.p.m., and this relationship is used to control blower output. In still other embodiments, a relationship between blower torque and actual airflow is used to control blower output.

When developing the control algorithm for controller 220, nonlinear relationships that may occur throughout HVAC component 210, for example, the relationship between the actual and measured airflow and between blower 212's commanded and actual output are taken into account. Up to fifth degree polynomials have been used with embodiment of the present invention to curve-fit the test data and develop a control algorithm, although higher or lower order polynomials may be used if required.

The ability to compensate for nonlinear responses throughout the HVAC component 210 dramatically increases the number of locations where the measurement device may be located. For example, static pressure sensor 216 may be located in regions where the airflow is laminar, turbulent, a combination of laminar and turbulent or variable between laminar and turbulent depending on the actual airflow through HVAC component 210, provided that the location of the measurement device results in the measured airflow varying in a sufficiently consistent and incrementally detectable manner between low, or no, airflow conditions and high airflow conditions to allow the derivation of usable control algorithms. This ability to accurately control the airflow of an HVAC system without regard to whether the airflow in the vicinity of the measurement device is turbulent or laminar represents a significant increase in capability over existing HVAC control systems. Additionally, the ability to fix a measurement device at an increased number of locations throughout the HVAC system allows the measurement device to be placed in more optimal locations for manufacturing and cost saving purposes without sacrificing performance.

In addition to compensating for nonlinear responses, embodiments of the present invention are able to compensate for inaccuracies in the measurement device and inaccuracies in the airflow regulator which allows for the use of less expensive measurement devices and airflow regulators. For example, since the location of the measurement device in and the airflow through HVAC component 210 during testing is substantially similar to the location of the measurement device in and the airflow through HVAC component 210 when in use, there is no requirement for the measured airflow, as detected by the static pressure sensor 216, to closely approximate the actual airflow. Provided that the measured airflow varies in a sufficiently consistent and incrementally detectable manner between low, or no, airflow conditions and high airflow conditions, various different types of measurement devices may be used. As such, less expensive measurement devices and airflow regulators may be used in lieu of more expensive equipment while preserving the ability to accurately control airflow.

Once the control algorithm for controller 220 has been derived, a plurality of HVAC components 210 are produced.

Each HVAC component 210 may then be connected to a building's HVAC system with controller 220 receiving input from an occupant control, for example occupant control 110 in FIG. 1A, and static pressure sensor 216, and controller 220 regulating the output of blower 212 and the airflow entering the building at a desired level.

In the illustrated embodiment, a user inputs a desired volumetric airflow rate, for example in cubic feet per minute, and the HVAC component 210 maintains the actual airflow output at the desired, also referred to as the commanded, airflow rate. The actual airflow rate maintained by embodiments of the present invention does not differ from the commanded rate by more than ten percent (10%) of the commanded rate throughout the operational range of the HVAC component (from minimum airflow, which can include no airflow, to maximum airflow). The actual airflow rate maintained by other embodiments of the present invention does not differ from the commanded rate by more than five percent (5%) of the commanded rate throughout the operational range of the HVAC component (from minimum airflow, which can include no airflow, to maximum airflow). The actual airflow rate maintained by still other embodiments of the present invention does not differ from the commanded rate by more than three percent (3%) of the commanded rate throughout the operational range of the HVAC component (from minimum airflow, which can include no airflow, to maximum airflow). As such, the appropriate amount of air as required by standards and regulations can be supplied to the building. Other embodiments allow the user to input other parameters, for example the number of occupants in a building, which may also be automatically counted, and the controller 220 automatically calculates and commands an appropriate airflow rate.

Another advantage realized by embodiments of the present invention is the ability to control the volumetric airflow of an HVAC system without the need to have a trained professional balance the system. Since HVAC component 210 automatically controls its output at a specific volumetric airflow rate, there is no need to adjust the building's HVAC system to deliver a particular airflow rate once HVAC component is installed. This ability mitigates the requirement to have a trained professional balance and adjust the building's HVAC systems during, for example, initial set up.

Yet another feature of embodiments of the present invention is the ability to control the actual airflow entering the building with a relatively small and compact unit. In order to accurately measure and control the volumetric airflow in an HVAC system, prior HVAC systems have required long ductwork in order to straighten the airflow and deliver laminar flow to the measurement devices. See, for example, the long ductwork depicted in FIG. 4. Embodiments of the current invention, for example the HVAC component 210 depicted in FIG. 2 and HVAC rooftop until 120 in FIG. 1A, do not require the delivery of laminar airflow to the one or more measurement devices as described above. As such, embodiments of the current invention do not require the large amount of roof space to place the long airflow straightening duct.

Still another feature of embodiments of the present invention is the ability to add additional components to, or remove components from, the HVAC system without requiring additional balancing of the HVAC system or modification to the control algorithms. For example, if an economizer, ERV or powered exhaust is added to a typical HVAC system, the airflow into the building is changed and the HVAC system requires rebalancing to ensure delivery of the appropriate airflow. In contrast, if an economizer, ERV or powered exhaust is added to an HVAC system that, for example, includes HVAC component 210, there is no need to readjust the system. The control algorithm in controller 220 would continue to increase, decrease or hold constant the airflow regulator's output, for example blower 212's output, to achieve the desired volumetric airflow rate. Provided that the static pressure sensor 216 remained at the building supply opening 222, the HVAC system would deliver, within the capabilities of blower 212, the commanded volumetric airflow at the building's opening, irrespective of the subcomponents that were added to the HVAC system upstream of the building supply opening 222.

Still a further feature of embodiments of the present invention is the ability to automatically deliver the appropriate airflow despite subcomponent performance degradation over time. For example, in a typical HVAC system an increased amount of dust in the duct work or a decreased output of the blower over time will result in less volumetric airflow than desired being delivered to the building. In contrast, controller 220 of HVAC component 210 will automatically increase the output of blower 212 if the airflow as measured by probe 216 decreases due to, for example, increased dust or decreased blower 212 efficiency over time.

FIG. 4 displays a test system, for example an airflow analysis system 400, according to one embodiment of the present invention. System 400 includes a source of air, for example a test blower 401, which is provided into a transitional input duct 402. Air from this input duct is provided to a test article 410. Air exiting the test article 410 is provided to a transitional output duct 404 and back to ambient conditions. A first measurement station 406 provides data regarding the airflow within duct 402, as well as data regarding properties of the inlet air. A second measurement station 408, located in the return duct 404, provides a measurement of airflow within return duct 404, as well as data regarding properties of the return air. Preferably, system 410 is certified according to relevant standards, for example, standards promulgated by the Air Movement & Control Association International, Inc. (AMCA).

The test article 410 is preferably a component associated with a rooftop-mounted air supply system, such as an HVAC rooftop unit, a curb, an economizer, an ERV, or a powered exhaust for example. In some embodiments, a single such unit is provided air from transitional input duct 402, with air being returned through transitional output duct 404. However, alternate embodiments include testing multiple units, and testing the multiple units as they would be arranged on a building. As an example, transitional inlet duct 402 could provide airflow into an inlet of an ERV, for example inlet 1016 of ERV 1010 (FIG. 10), and return duct 404 could be provided with airflow that passes through the outlet of an ERV, for example, outlet duct 1018 of the ERV 1010, and also through a curb, for example, through the supply alignment duct 1536 of the curb 1535 (see FIG. 15). As another example, air could be provided through transitional input duct 402 and into the inlet 143 of the economizer 140 (FIG. 1A), with the air subsequently being provided to inlet 131, with the air exiting the HVAC unit 120 through HVAC supply duct 123, which passes the air into the transitional output duct 404.

"Model numbers" and "serial numbers" are common in manufacturing. In one embodiment of the present invention, it has been determined that testing with the flow measurement calibration system 400 need take place only once, or a limited number of times, for a single, specific model number or replaceable configuration. The measurements and calibrations acquired in flow measurement calibration system 400 have been found to be accurate for similar configurations, for example those with the same model number and different specific serial numbers, provided that the manufacturing processes are adequately controlled.

With regards to the testing of multiple, interconnected units, it has likewise been found that testing a specific configuration of economizer, such as one with a specific model number, with a specific configuration of powered exhaust, such as one with a specific model number, likewise provides accurate measurements and calibrations for any subsequent combination of economizer and powered exhaust with the same model numbers and different serial numbers.

FIGS. 5 and 6 depict another example of HVAC rooftop unit 520 for building 105, which includes a blower and heat exchanger component 522 and an ERV 550, according to another embodiment of the present invention. The blower and heat exchanger component 522 receives air through an airflow housing with an airflow passage, for example intermediate duct 525, from the ERV 550, both of which are mounted to a curb assembly 535. ERV 550 includes an inlet 553 for the intake of ambient air, and an outlet 554 for exhausting air to ambient. Measurement devices, for example airflow detectors 562a-c, are also included in HVAC rooftop unit 520. Airflow detector 562a is located in an airflow housing with an airflow passage supplying air to the building, for example building supply duct 556, to supply information related to the airflow entering the building to a controller, for example electronic controller 560. Airflow detectors 562b and 562c are located on the inlet side of ERV 550 with airflow detector 562b upstream and airflow detector 562c downstream of rotating heat exchanger 555, respectively, and supply information to electronic controller 560 concerning the operation of rotating heat exchanger 555 and ERV 550. In the illustrated embodiment, airflow detectors 562b and 562c include static pressure and temperature sensors. The electronic controller 560 operates a variety of actuators based on various sensory and command inputs as processed through one or more software algorithms.

FIG. 6 is a schematic representation of the apparatus of FIG. 5, and depicts the flow of air through ERV 550. Inlet air from inlet 553 is provided to one side of an energy exchanger, for example, a rotating heat and humidity exchanger core 555 or the like. Conditioned air exiting rotating heat exchanger 555 is provided to the blower and heat exchanger component 522 for additional filtering and conditioning, and is finally delivered into interior airspace 106 through building supply duct 556. Return flow from interior airspace 106 is provided through building return duct 557 and into return air inlet 558 of ERV 550. This return air from airspace 106 is provided to the other side rotating heat and humidity exchanger 555, which transfers the heat and humidity to the inlet air. After exchanging sensible and/or latent heat with rotating heat and humidity exchanger 555, air is exhausted through outlet 554 into ambient conditions.

Figure 7:
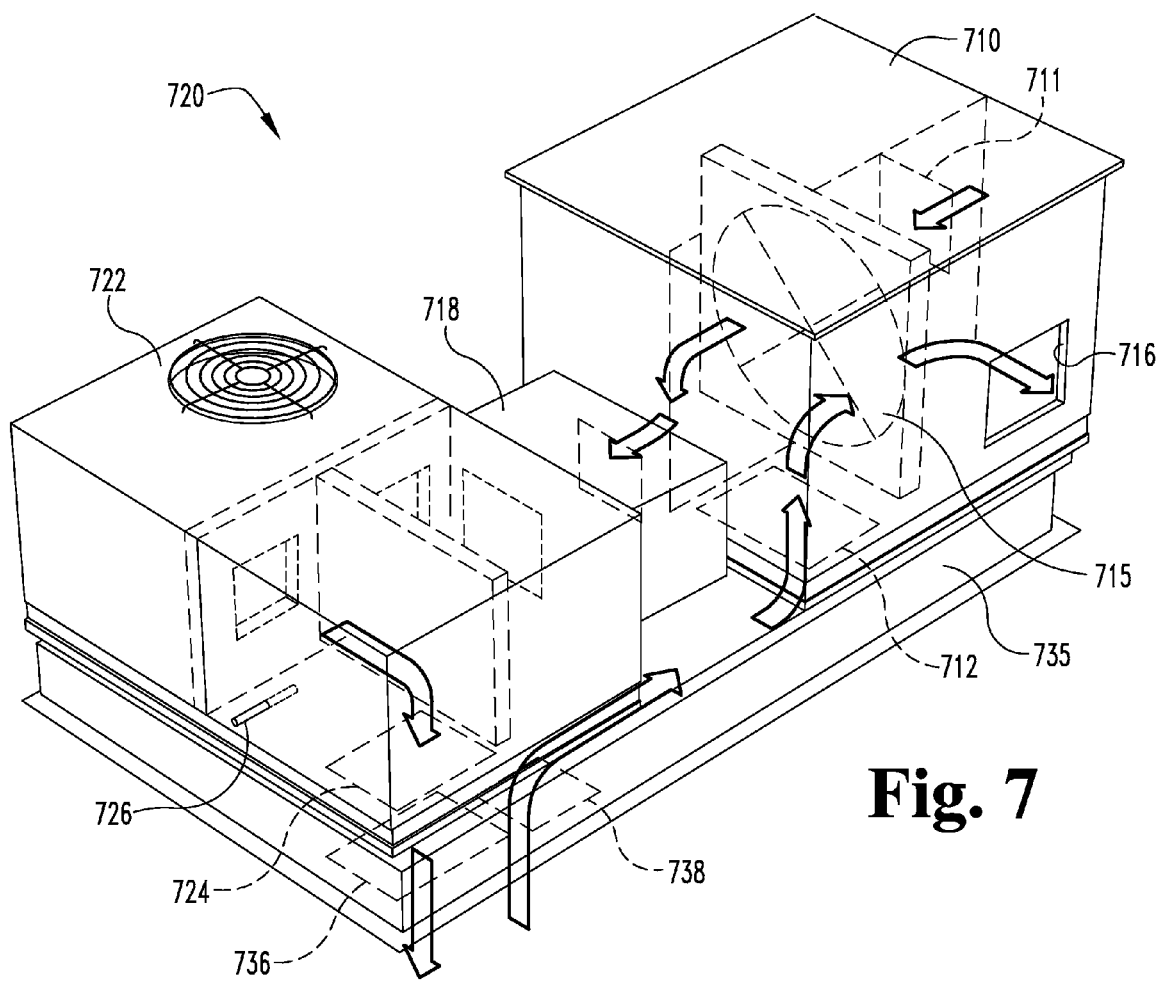
FIG. 7 is a perspective view of an HVAC rooftop unit depicting airflows into and out of the components according to still another embodiment of the present invention.

FIG. 7 is a schematic perspective view of another example HVAC rooftop unit 720, which includes blower and heat exchanger component 722 and ERV 750, according to still another embodiment of the present invention depicting airflows into and out of the system. Air enters ERV 710 through inlet 711 and passes through the inlet air side of rotating heat and/or humidity exchanger 715. The air then passes through intermediate duct 718 and into blower and heat exchanger component 722 where the air is either heated or cooled to the appropriate temperate for entry into the building. Prior to leaving blower and heat exchanger component 722 through building supply duct opening 724, the conditioned air passes by airflow detector 726. Characteristics of the conditioned air passing airflow detector 726 are used to control the airflow exiting through building supply duct opening 724. After leaving blower and heat exchanger component 722, the conditioned supply air travels through curb supply duct 736 of curb 735 and into the building.

Return air from the building enters curb 735 through curb return duct opening 738 and travels through curb 735 until entering ERV 710 through building return duct opening 712. The return air then passes through the return side of rotating heat and/or humidity exchanger 715 and exits through exit opening 716.

Figure 8:
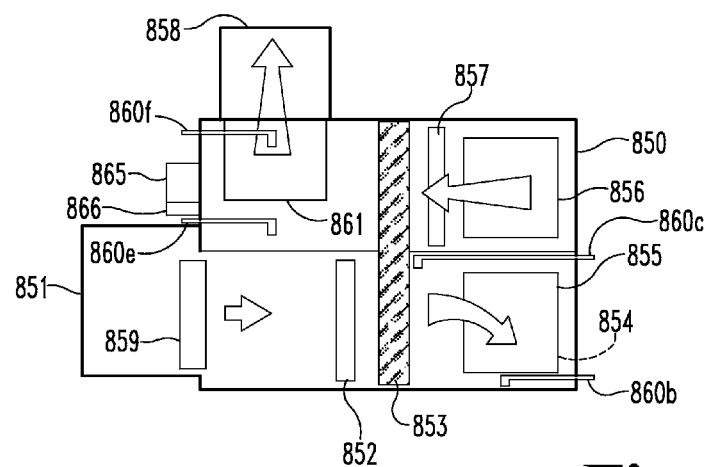
FIG. 8 is a top, schematic representation of an energy recovery ventilator according to one embodiment of the present invention.
Figure 9:
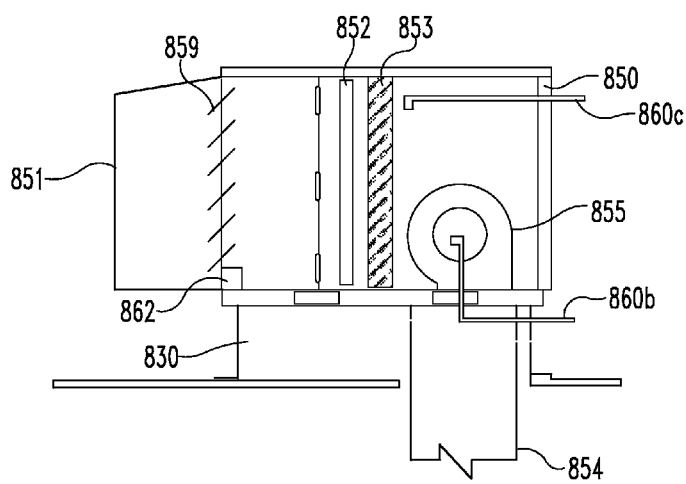
FIG. 9 is a side, schematic representation of the energy recovery ventilator of FIG. 8.

FIGS. 8 and 9 show top and side views of an ERV and powered exhaust component 850 according to another embodiment of the present invention. ERV 850 is of the downdraft variety, and is attached to a building's roof with curb 830. Air enters through an ambient intake 851, and passes through an airflow regulator, for example inlet louvers 859, through inlet filter 852, and through heat and/or humidity transferring apparatus 583 before proceeding through a downdraft duct 854 under the influence of another airflow regulator, for example motorized blower 855. Return air from the building's interior airspace, for example interior airspace 106 in FIG. 1, is provided through an upwardly oriented return duct 856, and preferably passes through a return air filter 857 and to heat and/or humidity transferring apparatus 853. Air exiting from heat and/or humidity transferring apparatus 853 is exhausted to ambient conditions through powered exhaust blower 861 and outlet 858.

ERV 850 includes a plurality of flow airflow detectors, for example static pressure probes 860b, 860c, 860e and 860f, for measuring airflow through ERV 850. Each static pressure probe 860 provides measurement of static pressure. Static pressure probe 860b provides readings of static pressure for air downstream of the inlet air side of transfer apparatus 853 and upstream of the airflow regulator, for example downdraft blower 855. Probe 860c provides measurement of static pressure adjacent the inlet of blower 855. A pair of static pressure probes, probes 860e and 860f, provide readings of static pressure upstream of another airflow regulator, for example, powered exhaust blower 861. Probe 860e provides measurement of static pressure adjacent the inlet of blower 861 while probe 860f provides measurement of static pressure upstream of blower 861 and at a greater distance fro the inlet to blower 861 than probe 860e.

Although what has been shown and described are static pressure probes, alternate embodiments of the present invention include other types of airflow detectors that permit measurement of pressure or other airflow characteristic, for example cooling ability, that include, as an example, pitot static probes and hot wire anemometers, including polymer-type hot wire anemometers. Additionally, while each pair of static pressure probes (860b/860c and 860e/860f) is located upstream of the pair's respective airflow regulator (blowers 85 and 861), either or both pairs may be located downstream of the pair's respective airflow regulator.

Locating each probe in a pair of probes on the same "side" of an airflow regulator with one probe "near" the airflow regulator and the other probe "away from" the airflow regulator allows the controller to detect various failure states of the airflow regulator, for example, a blocked flow situation where no air passes through the airflow regulator. It should be appreciated that if the probe located "away" from the airflow regulator is placed on the other "side" of second airflow regulator, the information obtained from the pair would include information relating to both airflow regulators. For example, if probe 860c were located upstream of heat and/or humidity transfer apparatus 853, a zero airflow situation sensed by probes 855b and 855c could indicate a "clogged" heat and/or humidity transfer apparatus 853, an inoperative blower 855, or both.

Although four measurement devices are depicted in FIGS. 8 and 9, alternate embodiments use as few as one measurement device to determine airflow through ERV 850. Still other embodiments use more than one, including more than four, measurement devices to provide input for controlling various individual subcomponents of ERV 850, for example, inlet louvers 859, filters 852 and 857, blowers 855 and 861, and heat and/or humidity transfer apparatus 853.

The static pressure probes 860b, 860c, 860e and 860f above are placed at locations similar to those used during previous flow testing of ERV 850. Data from these probes are provided to a controller 865 which processes that data, as well as other data and command inputs. Based on one or more algorithms stored in memory 866, controller 865 operates the variable frequency drives of blowers 855 and 861 to control airflow. In alternate embodiments, controller 865 also utilizes additional static pressure probes downstream of the one or more inlet louvers 859 and an actuator 862 to operate the one or more inlet louvers 859.

Figure 10:
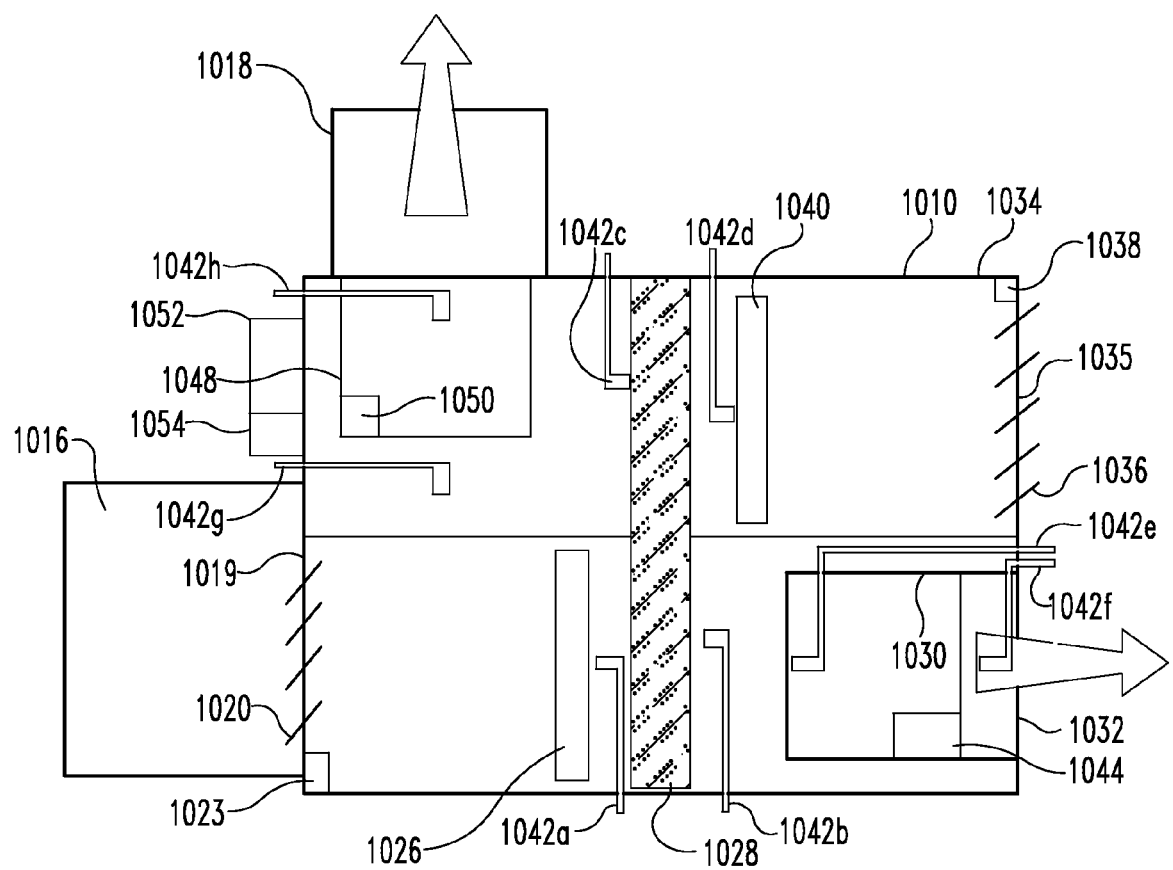
FIG. 10 is a schematic representation of an energy recovery ventilator according to another embodiment of the present invention.

FIG. 10 shows an ERV 1010 with a powered exhaust according to another embodiment of the present invention. ERV 1010 is a horizontally flowing ERV, which can operate as a stand-alone unit, or can provide air to a downstream HVAC blower and heat exchanger component. Air enters through an inlet 1016, and through an airflow regulator, for example inlet louvers 1020, also referred to as inlet dampers, which are under the control of an inlet louver actuator 1023. Air preferably passes through an inlet filter 1026, then through the "transfer out" portion of an ERV heat and/or humidity transfer apparatus 1028, and then through another airflow regulator, for example outlet blower 1030, and out through an outlet duct 1032, which goes either to the building supply ducts 107, or into the inlet of another HVAC component, for example inlet 131 of HVAC rooftop unit 120 (see FIG. 1A). Return air is provided to a return air inlet 1034 where it passes through another airflow regulator, for example a plurality of louvers 1036 that are operated by an actuator 1038. This air is preferably filtered through a return filter 1040, and then passes through the "transfer in" portion of the heat and/or humidity transfer apparatus 1028. Air exits the transfer apparatus 1028 and passes through yet another airflow regulator, for example, powered exhaust blower 1048, before exiting out to ambient conditions through outlet duct 1018, which may include a rain hood.

ERV 1010 incorporates a plurality of measurement devices, for example, static pressure probes 1042a-1042h. Static pressure probes 1042a and 1042b located upstream and downstream, respectively, on the inlet side of the heat and/or humidity transfer apparatus 1028. A second pair of static pressure probes 1042c and 1042d is located on the return side of heat and/or humidity transfer apparatus 1028, one each on the upstream and downstream sides, respectively.

A pair of static pressure probes 1042e and 1042f are located at the inlet of blower 1012, with probe 1042f located near blower 1012's intake and probe 1042e being located away from blower 1012's intake but still downstream of heat and/or humidity transfer apparatus 1028. In alternate embodiments static pressure probes 1042e and 1042f are located at the outlet (downstream side) of blower 1012. Blower 1012 is run by a variable frequency drive motor 1044, the operation of which is controlled by controller 1046. ERV 1010 also includes a pair of static pressure probes 1042g and 1042h, which are located at the inlet of powered exhaust blower 1048. In alternate embodiments, static pressure probes 1042g and 1042h are located at the outlet (downstream side) of blower 1048. Blower 1048 is run by a variable frequency drive motor 1050, the operation of which is controlled by controller 1046.

Static pressure probes 1042a-1042h are placed within ERV 1010 at substantially similar locations as those used during testing performed as described above with the test equipment of FIG. 4. The measurement devices are preferably located such that entrance effects and other local disturbances through, for example, airflow regulators such as inlet damper 1019 (for probe 1042a) or return air damper 1035 (for probe 1042d) can be taken into account by corrections within the software. It should be appreciated that the relative location of one subcomponent to another subcomponent affects the airflow. For example, the passage of air through a subcomponent, such as a heat and/or humidity transfer wheel or blower, can further "wash out" local flow variation from an upstream subcomponent, such as louvers and stream filters.

Additionally, measurement devices are placed at locations near a subcomponent that is to be controlled or monitored. As one example, probes 1042b and 1042c are located downstream of the "transfer out" and "transfer in" portions of heat and/or humidity transfer apparatus 1028, respectively, to monitor or control the performance of transfer apparatus 1028.

The data received from the static pressure probes 1042a-1042h during testing can be used in various ways to develop the control algorithms. For example, in embodiments where the pair of static pressure probes 1042g and 1042h are located downstream of the outlet blower 1048, the two pair of static pressure probes 1042c/1042d and 1042g/1042h can be used to monitor the airflow across heat and/or humidity transfer apparatus 1028 and out of outlet blower 1030. Icing may be indicated when the airflows across the heat and/or humidity transfer apparatus 1028 and the outlet blower 1048 do not match, and a defrost mode for heat and/or humidity transfer apparatus 1028 can be initiated in response. As another example, a single measurement device can provide data related to the flow entering the inlet 1016, and a single measurement device can provide data relating to the flow exiting outlet duct 1032.

Flow measurement calibration system 400 (FIG. 4) or a similar apparatus is used to test ERV 1010 and develop control algorithms that are stored in memory 1054. With these control algorithms stored in memory 1054, controller 1048 accurately controls the performance of ERV 1010, and in particular the airflow through ERV 1010, including the localized airflow through subcomponents of ERV 1010.

Although eight measurement devices are depicted in FIG. 10, alternate embodiment use as few as one measurement device to determine airflow through ERV 1010. Still other embodiments use more than one, including more than eight, measurement devices to provide input for controlling various individual subcomponents of ERV 1010, for example, inlet louvers 1020, filters 1026 and 1040, blowers 1030 and 1048, and heat and/or humidity transfer apparatus 1028.

Figure 11:
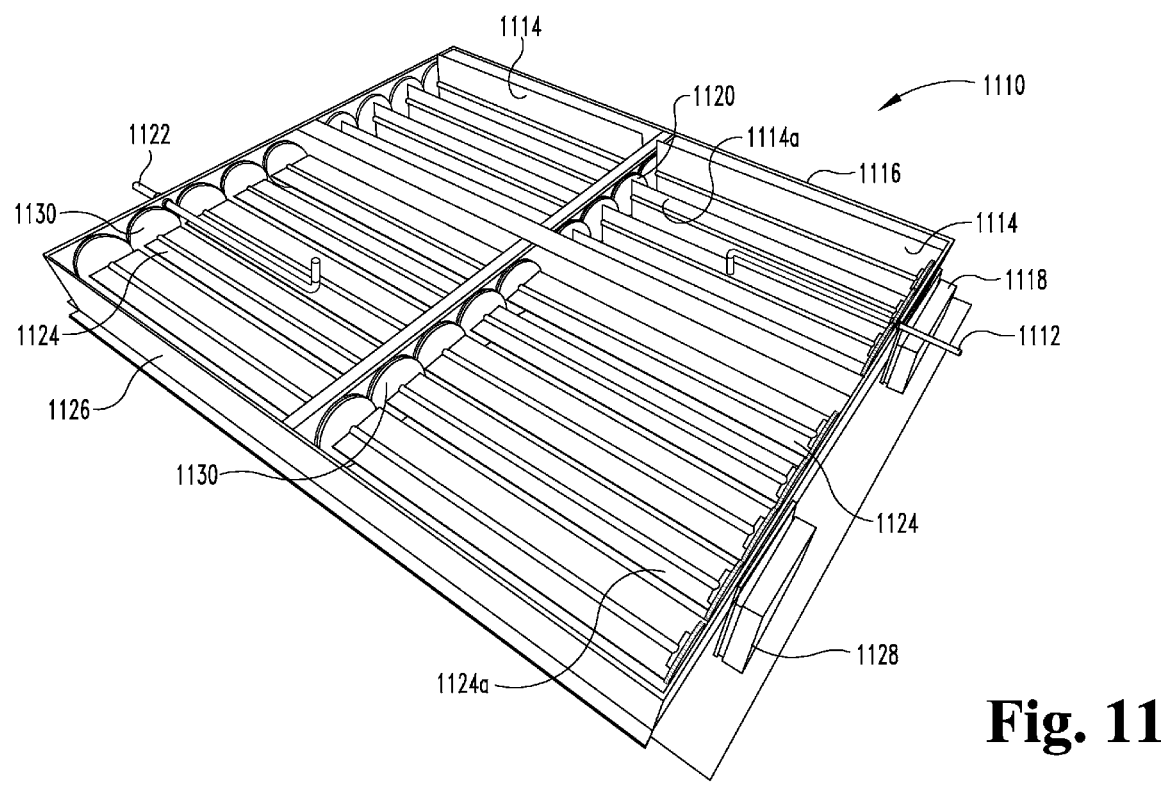
FIG. 11 is a perspective view of an economizer according to one embodiment of the present invention.

FIG. 11 is a perspective view of an economizer 1110 according to one embodiment of the present invention. A measurement device, for example an airflow detector such as inlet pressure probe 1112, measures the total and/or static pressures of air entering through a plurality of inlet louvers 1114 of inlet damper 1116. An inlet actuator 1118 preferably operates a single louver 1114a, which is then geared by a gear train 1120 or otherwise linked to cause the other louvers 1114 to move in unison. The total and/or static pressures of return air is measured by a probe 1122, which is placed in the airflow path associated with outlet louvers 1124 of outlet damper 1126. An outlet actuator 1128 preferably operates a single outlet louver 1124a, which is then geared through a gear train 1130, or other method of connectivity, to move the other louvers 1124 in unison. Data from pressure probes 1112 and 1122 are used by a controller to regulate the performance of economizer 1110.

Figure 12:
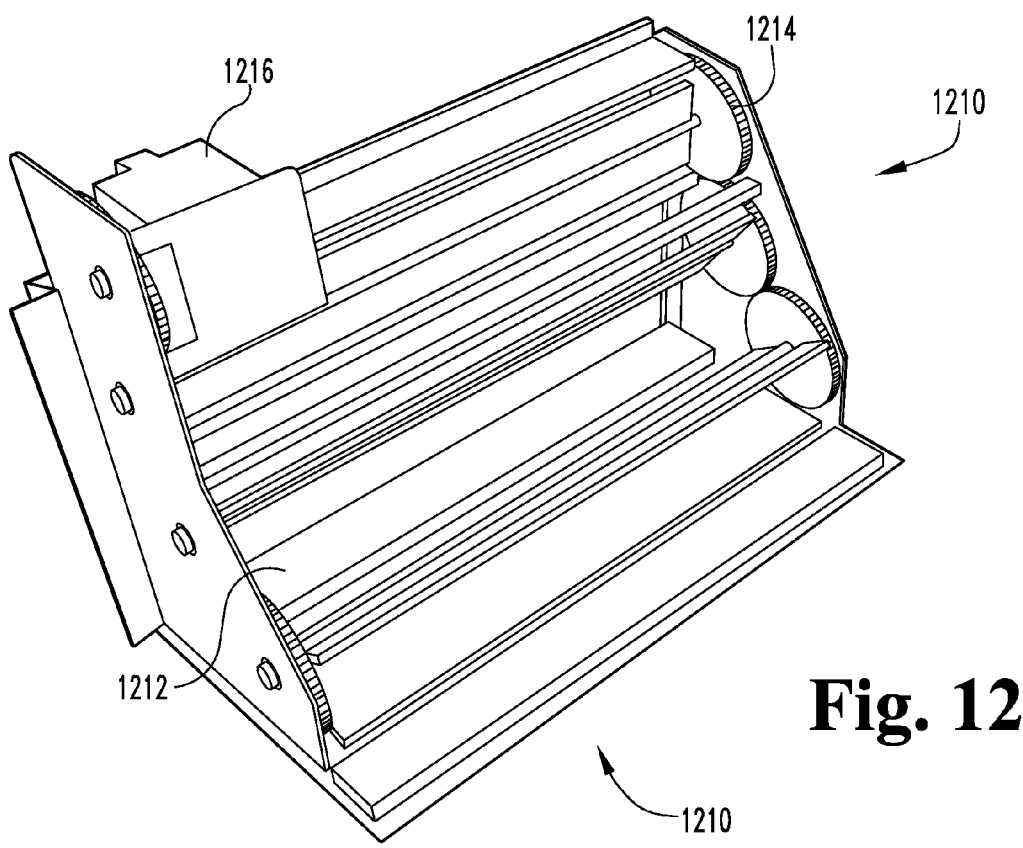
FIG. 12 is a perspective view of an economizer according to another embodiment of the present invention.
Figure 13:
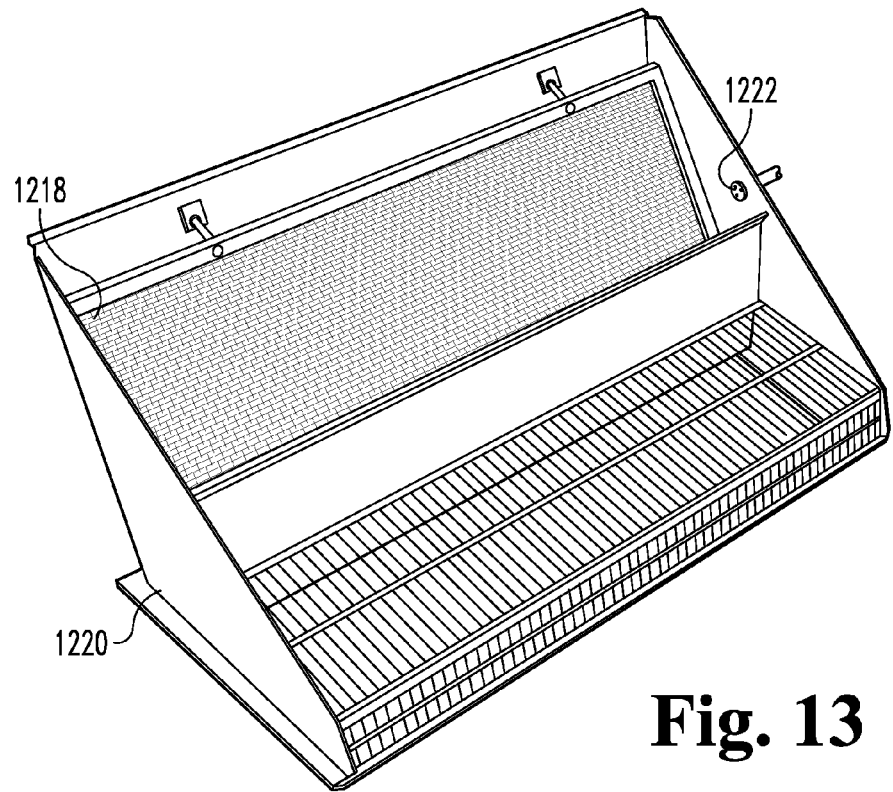
FIG. 13 is a perspective view of a filter element according to one embodiment of the present invention.

FIG. 12 shows an economizer 1210 according to another embodiment of the present invention. Economizer 1210 includes a plurality of louvers 1212, which are geared together by a gear train 1214 or otherwise operably connected together. Gear train 1214 is subsequently operated by an actuator 1216 under the control of a controller, for example controller 150 (FIG. 1A). In another embodiment, economizer 1210 includes a filter element 1218 (FIG. 13) located in a shroud 1220. An airflow detector, for example pressure probe 1222, is located downstream of filter element 1218, and data from probe 1222 is provided as an input to a controller, for example controller 150 to regulate and/or monitor the performance of economizer 1210.

Figure 14:
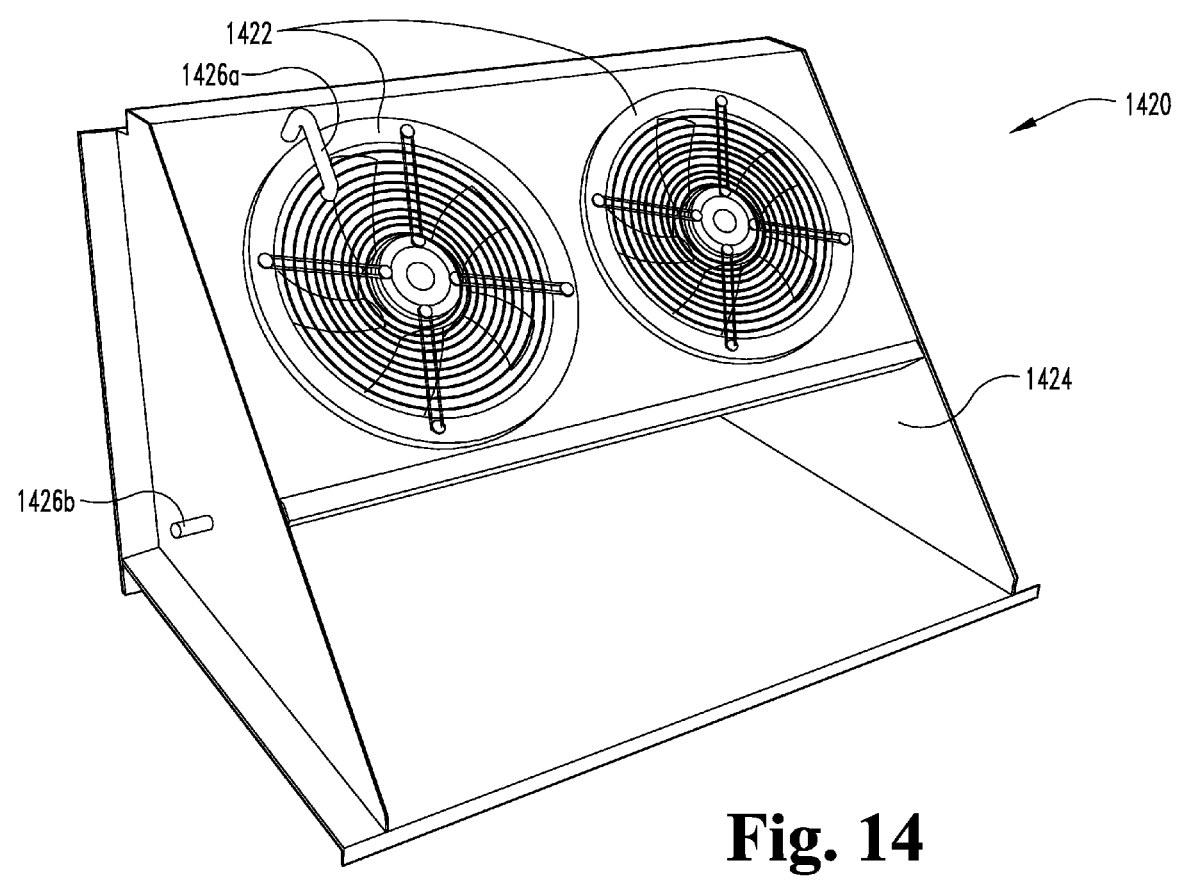
FIG. 14 is a perspective view of a powered exhaust according to one embodiment of the present invention.

FIG. 14 is a perspective view of a powered exhaust according to another embodiment of the present invention. Powered exhaust unit 1420 includes a plurality of exhaust fans 1422, two exhaust fans 1422 being depicted in the illustrated embodiment, mounted in a housing 1424, although alternate embodiments of powered exhaust unit 1420 include a single exhaust fan. Each fan 1422 is driven by a motor (not depicted), the speed of which is operably controlled by a controller, for example, controller 150 (FIG. 1A). In the illustrated embodiment of the present invention, two airflow detectors, for example static probes 1426a and 1426b, are placed downstream of an exhaust fan 1422, one near a fan 1422 and one away from fan 1422. In alternate embodiment the static probes are located upstream of exhaust fan 1422 to measure economizer output. Pressures from probes 1426a and 1426b, or signals corresponding to sensed pressures, are provided to a controller, for example controller 150, for use in the control algorithms.

Figure 15:
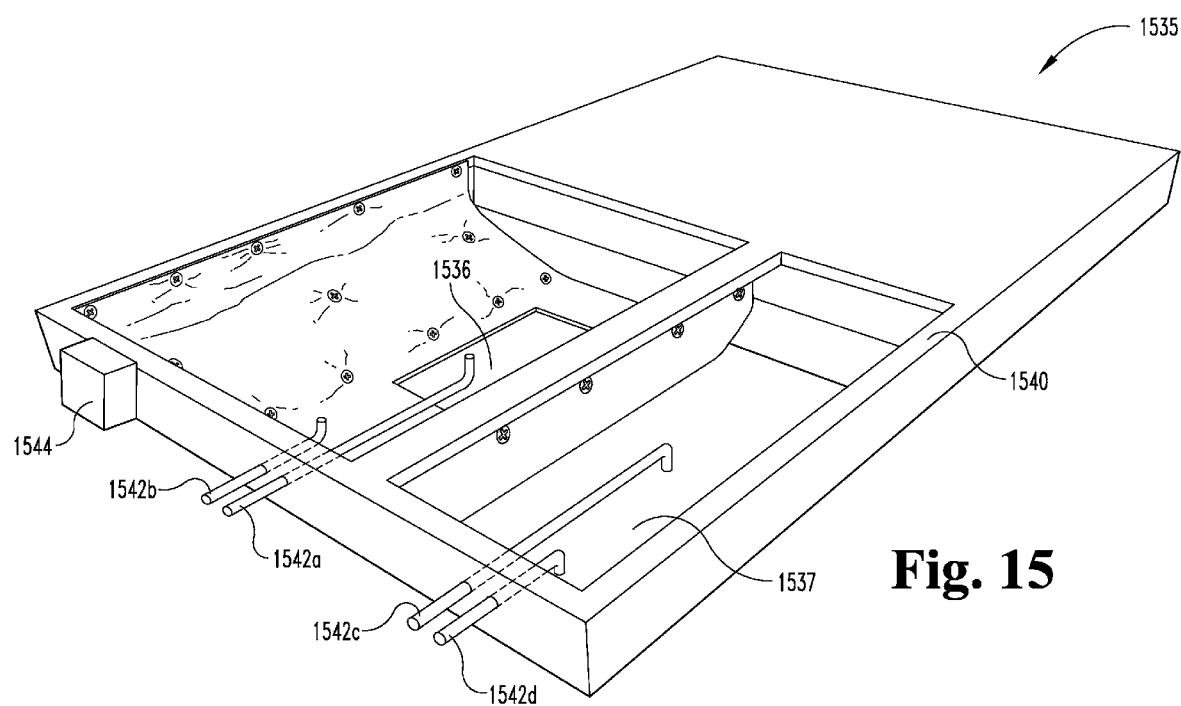
FIG. 15 is a perspective view of a curb according to one embodiment of the present invention.

FIG. 15 is a perspective view of a curb 1535 according to another embodiment of the present invention. Curb 1535 includes a mounting rail 1540 for attachment to an HVAC rooftop unit, an ERV, or the like. A supply alignment duct 1536 receives air from the output of the attached HVAC component and provides that air to the building supply ducts, for example supply duct 107 (see FIG. 1A). Air returned through the building return ducts, for example duct 108, returns through the return alignment duct 1537. In the depicted embodiment, a first measurement device, for example an airflow detector such as static pressure probes 1542a and 1542b are aligned and located to measure characteristics of the air at the entrance of the building, for example the static pressures. A second measurement device, for example static pressure probes 1542b and 1542c, are located and aligned to measure characteristics of the air returning from the building, for example the total pressures. The probes 1542a and 1542b are at different locations with respect to supply alignment duct 1536—one near and one away from alignment duct 1536. Similarly, probes 1542c and 1542d are at different locations with respect to return alignment duct 1537.

The pressures or signals from corresponding transducers are provided to a controller, for example controller 1544. In one embodiment, controller 1544 receives input signals and data (for example, outside air temperature, ambient pressure, $CO_2$ or CO concentration within the building, humidity, the temperature set point, blower speed and damper opening) from various sensors and subcomponents (for example the HVAC rooftop unit, ERV, economizer, occupant control and flow sensors). Controller 1544 processes these input signals and data using a control algorithm and sends commands to actuators to control various subcomponent operations, for example, damper openings and blower speeds. As such, levels of various compounds in the air can be controlled. For example, if the $CO_2$ level in the building becomes too high, the amount of outside air mixed in an economizer and/or the volumetric airflow entering the building can be increased to lower the $CO_2$ level. Additionally, embodiments of the present invention completely inhibit the flow of outside air into the HVAC system when the $CO_2$ and/or organic compound concentrations are sufficiently low.

Figure 16:
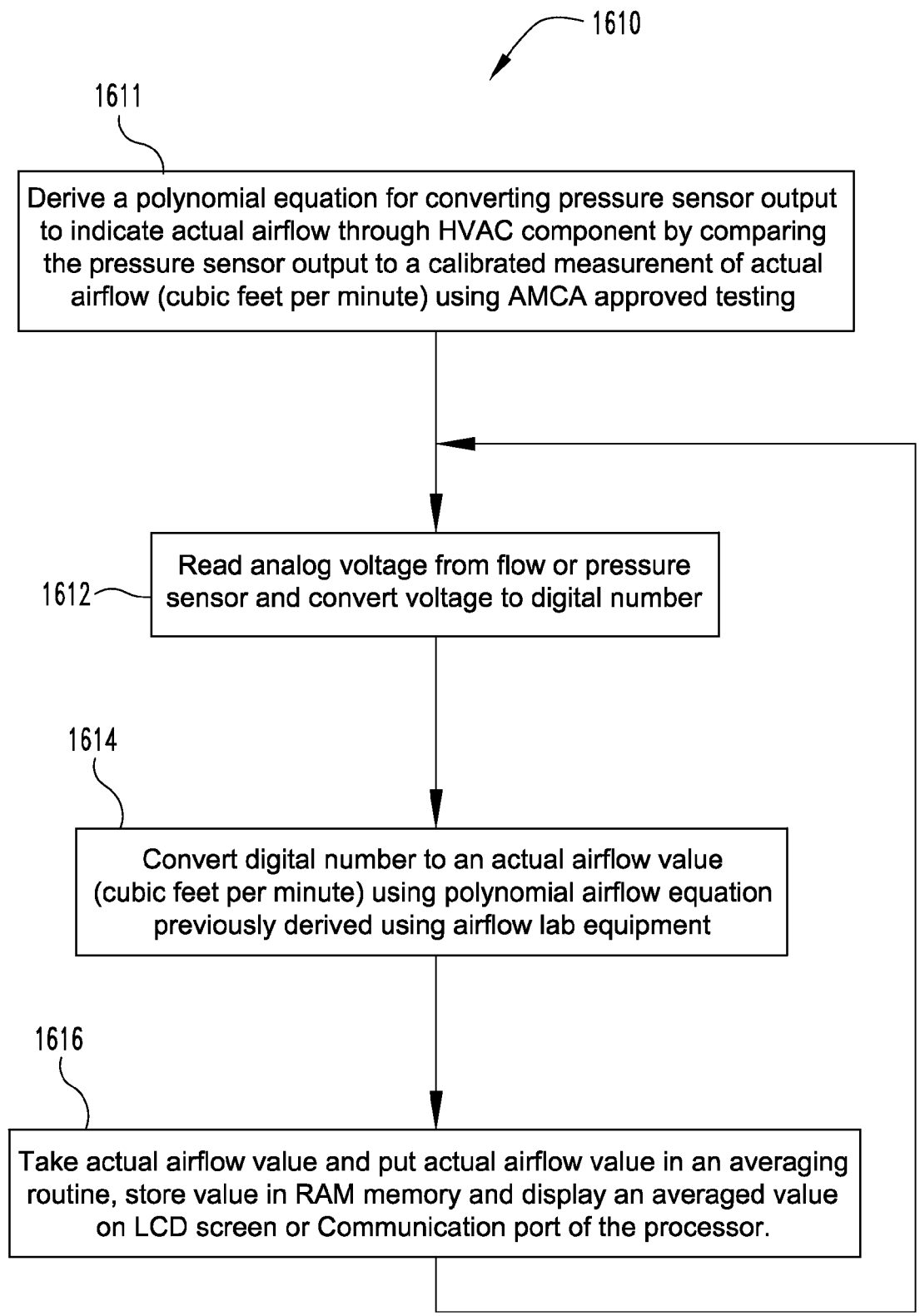
FIG. 16 is a flowchart for calculating actual airflow according to one embodiment of the present invention.

As previously discussed, embodiments of the present invention include methods for operation of an air control system including measurement and control of airflow. FIG. 16 presents a flowchart 1610 that includes calculating the actual airflow through the air control system given the measured airflow according to one embodiment of the present invention. Flowchart 1610 includes conversion of one or more pressure readings from various pressure sensors into numbers corresponding to the respective pressures in block 1612. In block 1614 the measured pressure values are used as input to a polynomial equation and the actual airflow value is calculated.

The polynomial equation is derived in block 1611 by testing the HVAC component using, for example, flow measurement calibration system 400 to determine the relationship between the actual airflow and the measured airflow. The test article 410 is substantially similar to the production HVAC component with static pressure probes, as one example, located at similar locations. The pressure readings from these probes are compared to the true airflow measurements provided by test sections 406 and 408. The polynomial equation is derived by curve fitting the data.

In embodiments where more than one HVAC component is controlled, more than one polynomial, at least one for each HVAC component, may be derived. The polynomial equations may or may not be of the same order depending on the test data. For example, two polynomials were used to control a combination economizer and powered exhaust HVAC unit, MicroMetl part number PECT03D21M9ABCD. The polynomial curve-fit for the economizer was fourth ($4^{th}$) order while the polynomial curve-fit for the powered exhaust was fifth ($5^{th}$) order. In particular, the following polynomials were used to develop the control algorithm for the combination economizer and powered exhaust HVAC unit:

Economizer curve: $y=-39.857x^4+678.16x^3-3631.6x^2+8610.3x-5552.1$

Powered Exhaust curve: $y=75.538x^5-953.86x^4+4711.8x^3-11469x^2+14407x-6636.3$

Figure 17:
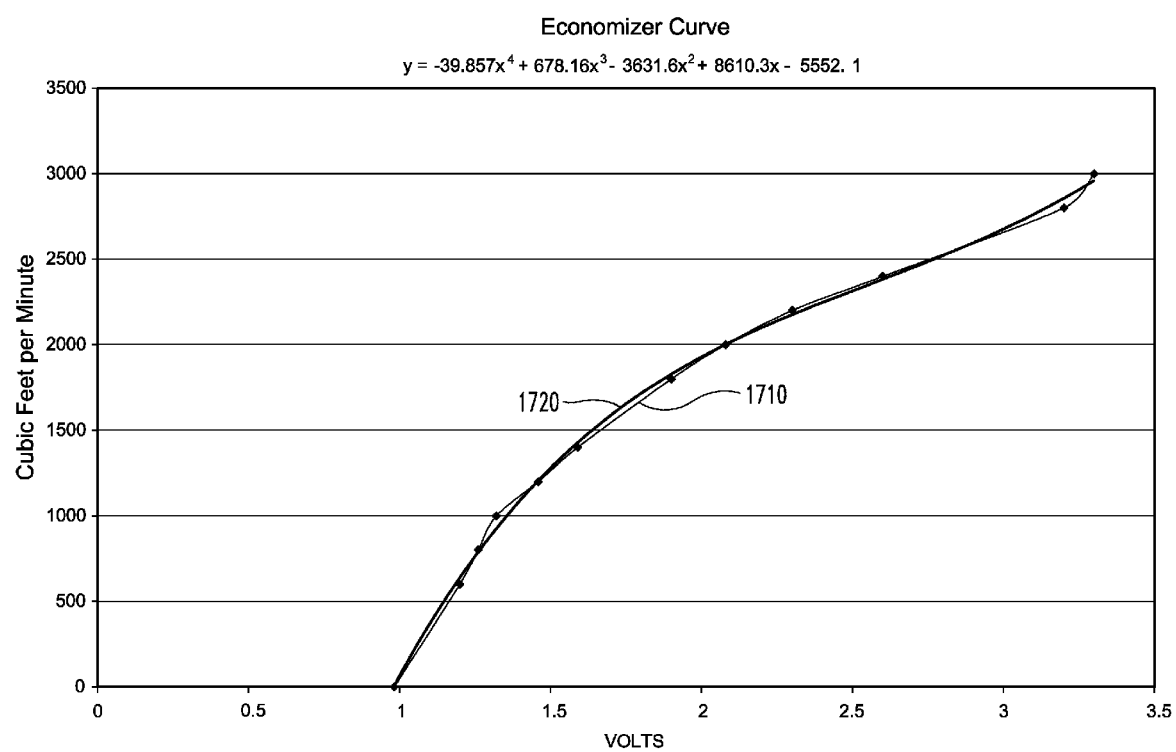
FIG. 17 is a graphical depiction of test data and an associated curve fit for an economizer according to one embodiment of the present invention.
Figure 18:
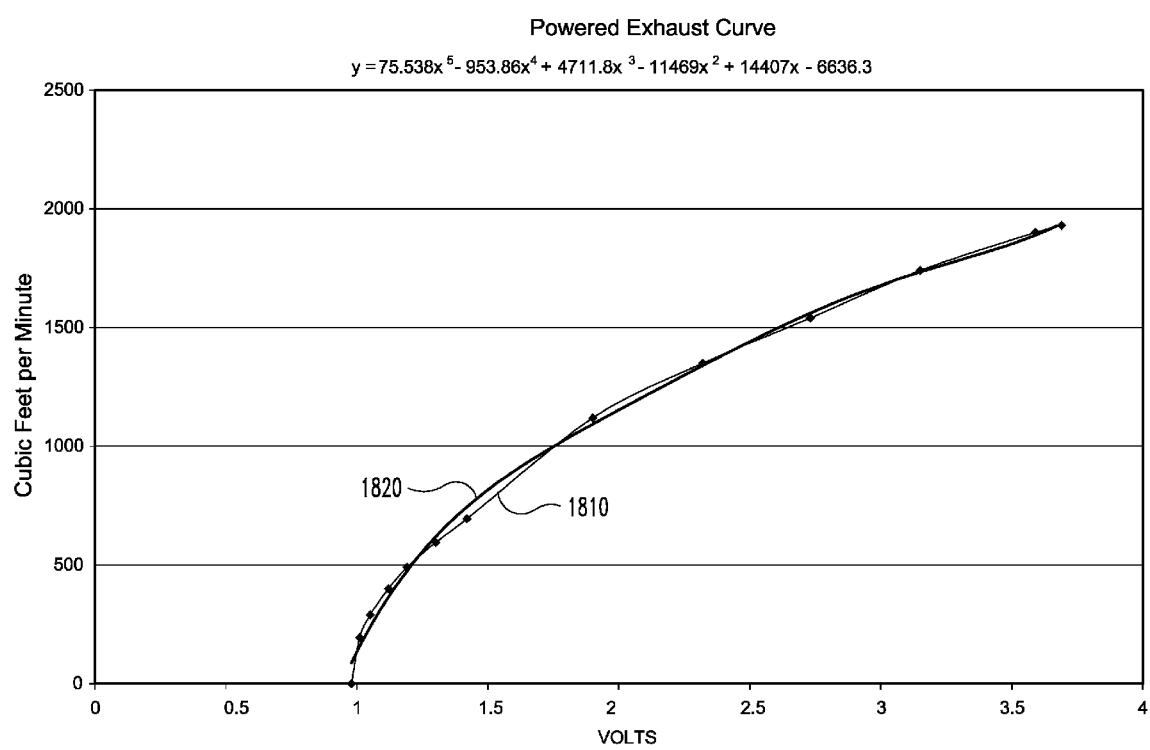
FIG. 18 is a graphical depiction of test data and an associated curve fit for a powered exhaust according to one embodiment of the present invention.

In the above polynomial equations, "x" is the voltage output, in volts, of the pressure sensor attached to the HVAC unit. The pressure sensor voltage output is input into the equation to determine "y"—the actual volumetric airflow through the HVAC unit in cubic feet per minute. The test data 1720 and curve-fit polynomial 1720 for the economizer component is depicted in FIG. 17, and the test data 1810 and curve-fit polynomial 1820 for the powered exhaust component is depicted in FIG. 18.

At block 1616, the inferred or calculated value of airflow is provided to a memory location where it is used by other parts of the software or hardware. Although the use of pressure readings and a fifth-order polynomial has been described, the present invention is not so limited, and contemplates other manners of relating one or more input parameters to a calculated airflow. For example, in alternate embodiments a lookup table is created and used instead of a polynomial equation.

Figure 19:
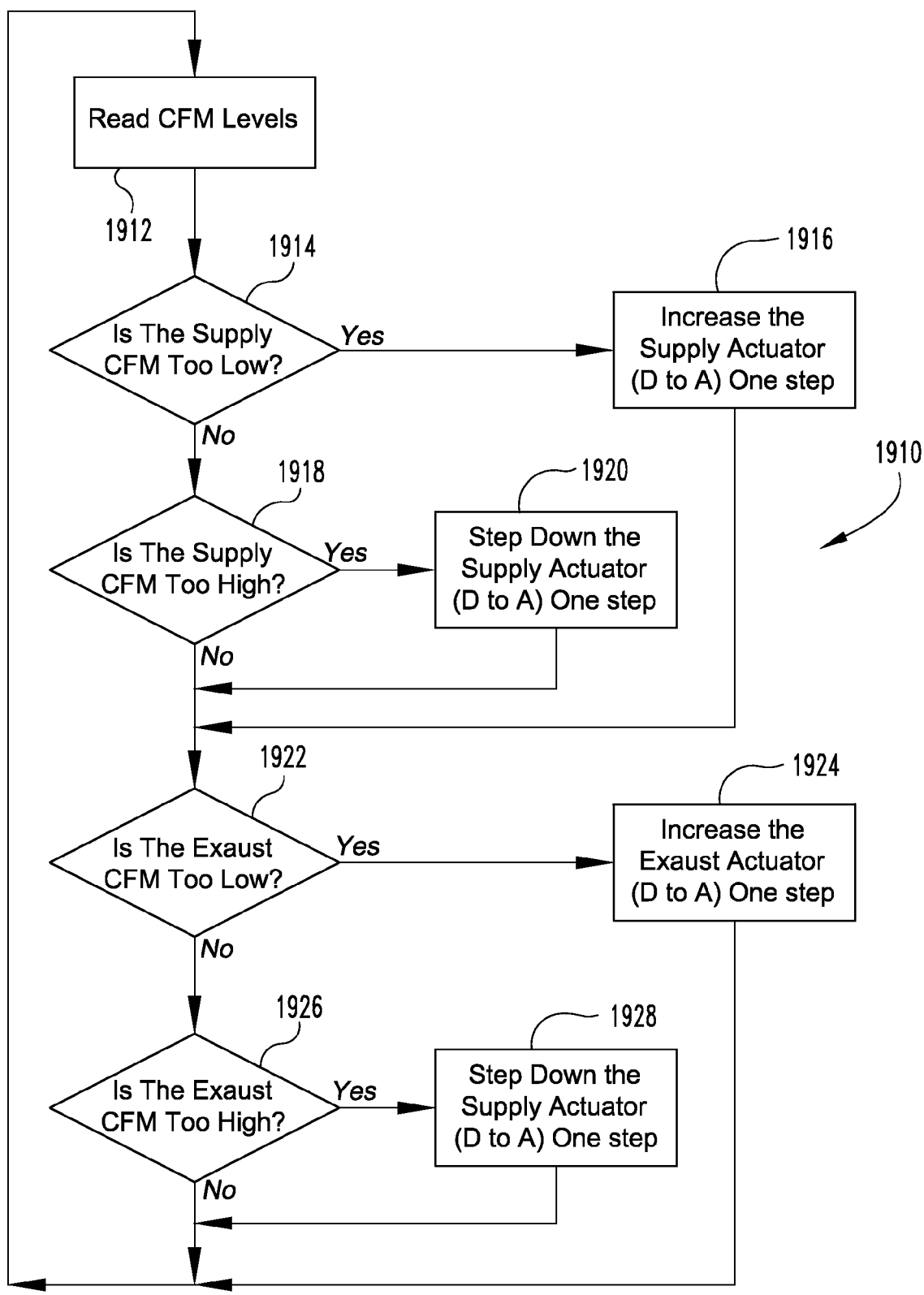
FIG. 19 is a flowchart for adjusting airflow according to another embodiment of the present invention.

FIG. 19 is a block diagram representation of a flow chart 1910 for the control and balancing of airflow within an air control system. A value of the actual supply airflow (typically in cubic feet per minute) of the system is provided in block 1912. Flow chart 1910 thereafter compares this actual supply airflow to a desired supply airflow for the current conditions and commands appropriate action. More particularly, if the actual supply airflow in the illustrated embodiment is too low (block 1914), the supply airflow actuator is commanded to increase output an incremental amount, which typically involves converting the digital command to an analog command (block 1916). If the actual supply air flow is too high (block 1918), the supply air flow actuator is commanded to decrease output an incremental amount, which typically involves converting the digital command to an analog command (block 1920). If the exhaust air flow is too low (block 1922), the exhaust air flow actuator is commanded to increase output an incremental amount, which typically involving conversion of the digital command to an analog command (block 1924). If the exhaust air flow is too high (block 1926), the exhaust air flow actuator is command to decrease output an incremental amount, which also typically involves converting the digital command to an analog command (block 1928). For example, if airflow in a particular part of the system is too high, then the appropriate actuators will operate to close louvers or reduce fan speed or the like. Conversely, if the measured airflow is too low, the appropriate actuators will operate other actuators to open louvers and/or increase fan speeds.

Figure 20:
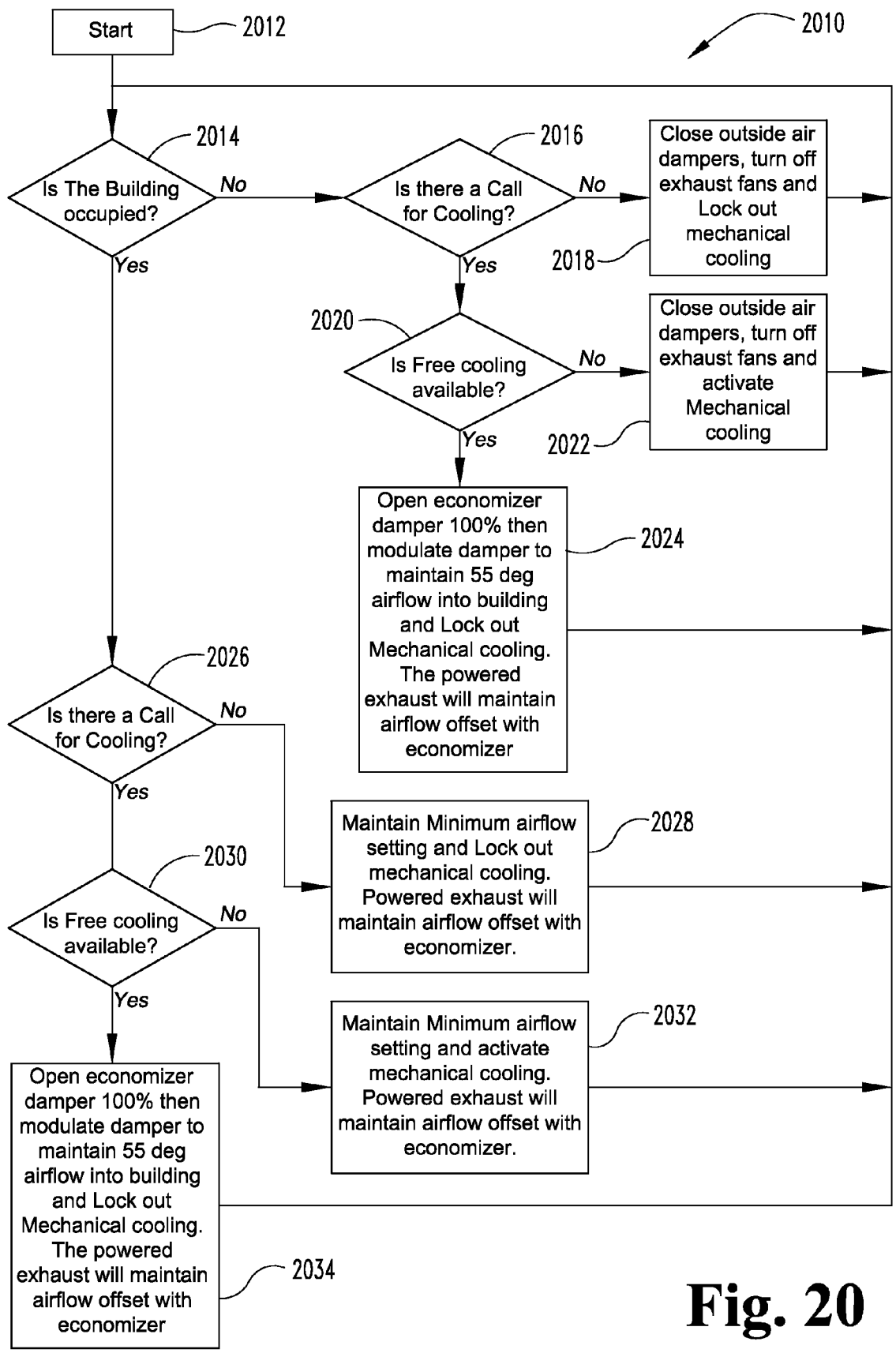
FIG. 20 is a flowchart for operating an economizer and powered exhaust according to another embodiment of the present invention.

FIG. 20 shows a software flow chart 2010 for operating one or more HVAC components, for example a combination economizer and powered exhaust unit. Flow chart 2010 includes a variety of sensory and user inputs, such as those shown in blocks 2014 and 2020. Example inputs include a calculation of enthalpy, which indicates whether or not "free cooling" (the ability to obtain cooled air without operating the HVAC system's primary heat exchanger) is available; whether or not the room or building is occupied; the number of occupants in the room or building; comparisons of various air temperatures; measurement of CO or $CO_2$ level; measurement of various compounds in the air, such as volatile organic compounds and user inputs as to a desired airflow rate. Based on these inputs, a cubic feet per minute balancing routine such as flow chart 2010 can be used to appropriately operate the louvers and/or fan speeds of the HVAC component.

The starting point of flow chart 2010 is at block 2012. If there is an indication that the building is not occupied (block 2014) and there is no request for cooling (block 2016), the economizer outside air dampers are closed, the powered exhaust fans are turned off and the HVAC system's primary heat exchanger is deactivated ("locked out") (block 2018).

If the building is not occupied and there is a request for cooling, such as the building's interior temperature being above the building's thermostat setting, a determination is made whether free cooling is available (block 2020). If free cooling is not available, the economizer's outside air dampers are closed, the powered exhaust fans are turned off and mechanical cooling is activated, i.e., the HVAC system's primary heat exchanger is activated (block 2022). Conversely, if free cooling is available, the economizer's dampers are placed in the fully-opened position then modulated to maintain the temperature of the air entering the building at a specified level, for example 55° F., and mechanical cooling is deactivated (block 2024). Simultaneously in block 2024, the powered exhaust will maintain its airflow at a predetermined offset from the economizer's airflow to maintain an appropriate overpressure within the building.

If the building is occupied and there is no call for cooling (block 2026), the HVAC system will maintain a minimum airflow setting while deactivating mechanical cooling (block 2028). Simultaneously in block 2028, the powered exhaust will maintain its airflow at a predetermined offset from the economizer's airflow.

If the building is occupied and there is a call for cooling, a determination is made of whether free cooling is available (block 2030). If free cooling is not available, the HVAC system maintains a minimum airflow setting and activates the HVAC system's primary heat exchanger while the powered exhaust maintains its airflow at a predetermined offset from the economizer's airflow (block 2032). However, if free cooling is available the economizer's dampers are initially opened one hundred percent and then modulated to maintain the airflow into the building at a predetermined temperature, for example, 55° F. (block 2034). Simultaneously in block 2034, mechanical cooling is deactivated and the powered exhaust maintains its airflow at a predetermined offset from the economizer's airflow.

Embodiments of the present invention include HVAC systems that deliver conditioned air to a building. In particular, embodiments of the present invention include HVAC systems with at least two (2) and at most one hundred five (105) tons of cooling capacity, which approximately correlates to HVAC systems with at least six hundred (600) cubic feet per minute capacity and at most forty-two thousand (42,000) cubic feet per minute capacity. More particularly, embodiments of the present invention include HVAC systems with at least two (2) and at most twenty-five (25) tons of cooling capacity.

While example embodiments of the invention have been illustrated and described in detail in the drawings and foregoing description, the same is to be considered as illustrative and not restrictive in character, it being understood that only exemplary embodiments have been shown and described and that all changes and modifications that come within the spirit of the invention are desired to be protected. Dimensions, whether used explicitly or implicitly, are not intended to be limiting and may be altered as would be understood by one of ordinary skill in the art.

What is claimed is:

1. A method for manufacturing at least one HVAC component adapted to connection to a building's HVAC system, wherein the HVAC component delivers a calibrated amount of air to the building's HVAC system, the method comprising the acts of:

forming a first HVAC component, said forming including:
    forming a first housing with a first airflow passage configured and adapted to connect to HVAC ducting installed in a building with the first airflow passage in fluid communication with the HVAC ducting,
    attaching a first airflow regulator to the first housing and, the first airflow regulator adapted to regulate the airflow through the first airflow passage,
    attaching a first airflow detector to the first housing at a first location, the first airflow detector adapted to measure a measured airflow through the first airflow passage;
    connecting a first controller with a memory to the first airflow regulator and to the first airflow detector, the first controller configured and adapted to receive a measured airflow valve from the first airflow detector and command the airflow regulator to change the amount of air moving through the first airflow passage, calibrating the first HVAC component to deliver an actual volumetric airflow, said calibrating including:
moving air through the first airflow passage,
obtaining a measured airflow by measuring the airflow through the first airflow passage with the first airflow detector,
obtaining an actual volumetric airflow by determining the airflow through the first airflow passage with a calibrated test system,
determining a correction to convert the measured airflow to the actual airflow, and
applying the correction to the first controller, wherein the first controller:
commands the first airflow regulator to increase the airflow through the first airflow passage when the actual volumetric airflow is below a desired airflow, and
commands the first airflow regulator to decrease the airflow through the first airflow passage when the actual volumetric airflow is above a desired airflow.

2. The method of claim 1, further comprising:
forming:
a second HVAC component, including a second housing substantially similar to the first housing and including a second airflow passage,
a second airflow detector substantially similar to the first airflow detector,
a second airflow regulator substantially similar to the first airflow regulator, and
a second controller substantially similar to the first controller with the correction applied;
attaching:
the second airflow detector to the second housing at a second location, wherein the second location of the second airflow detector in the second housing is substantially similar to the first location of the first airflow detector in the first housing, and
the second airflow regulator to the second housing and within the second airflow passage;
connecting:
the second airflow detector and the second controller, and
the second controller and the second airflow regulator; and
wherein the second controller:
commands the second airflow regulator to increase the airflow through the second airflow passage when the actual airflow is below a desired airflow,
commands a decrease in the second airflow regulator to decrease the airflow through the second airflow passage when the actual airflow is above a desired airflow.

3. The method of claim 1, wherein said obtaining an actual volumetric airflow includes measuring actual airflow through the first airflow passage with a test airflow detector, and wherein said determining the actual volumetric airflow through the first airflow passage includes measuring the airflow through the first airflow passage with the test airflow detector.

4. The method of claim 1, wherein the first airflow regulator includes a first damper.

5. The method of claim 1, wherein said attaching a first airflow regulator includes attaching a first blower within the first housing, and wherein said attaching a first airflow detector includes attaching the first airflow detector within the first housing.

6. The method of claim 5, wherein said moving air through the first airflow passage is by the first blower.

7. The method of claim 1, wherein said applying the correction to the first controller includes applying a polynomial equation the measured airflow value received from the first airflow detector.

8. The method of claim 7, wherein the polynomial equation is at least a $2^{nd}$ order polynomial.

9. The method of claim 1, further comprising:
providing the building's HVAC system, wherein the building's HVAC system includes at least two (2) tons of cooling capacity and at most twenty-five (25) tons of cooling capacity.

10. The method of claim 1, wherein the airflow is turbulent at the first location during said obtaining a measured airflow.

11. The method of claim 1, wherein said calibrating compensates for nonlinear responses within the HVAC component.

12. A plurality of HVAC systems, each system with at least one HVAC component adapted to control the volumetric airflow through the HVAC system, each of the plurality of HVAC system components being substantially similar to one another, at least one of the HVAC system components comprising:
a first HVAC component, including:
a first housing with a first airflow passage configured and adapted to connect to one of the HVAC system's ducting with said first airflow passage in fluid communication with the HVAC system's ducting,
a first airflow regulator attached to said housing within said airflow passage and adapted to change the airflow through said airflow passage,
a first airflow detector attached to said housing within said airflow passage and adapted to measure the airflow passing through said first airflow passage, and
a first controller with a memory, said first controller connected to said first airflow regulator and said first airflow detector, wherein said first controller commands said first airflow regulator to change the airflow rate through said first airflow passage to achieve a desired actual airflow rate using a control algorithm;
means for deriving said control algorithm including means for measuring the actual volumetric airflow through said first HVAC system component, wherein the control algorithm converts input from the first airflow detector to an actual volumetric airflow rate through said first HVAC system component, and wherein the control algorithm compares the actual airflow rate to a desired airflow rate.

13. The plurality of HVAC systems of claim 12, further comprising a first HVAC system connected to said first HVAC component, wherein said first HVAC system includes at least two (2) tons of cooling capacity and at most twenty-five (25) tons of cooling capacity.

14. The plurality of HVAC systems of claim 12, further comprising:
means for forming at least a second HVAC component substantially similar to said first HVAC component, wherein said second HVAC component includes:
a second housing with a second airflow passage substantially similar to said first housing and said first airflow passage;
a second airflow regulator for changing the airflow through said second airflow passage and substantially similar to said first airflow regulator;
a second airflow detector for measuring the airflow passing through said second airflow passage, and a second controller with a memory, said second controller connected to said second airflow regulator and said second airflow detector, wherein said second controller is substantially similar to said first controller, and wherein said second controller commands said second airflow regulator to change the airflow rate through said second airflow passage to achieve a desired actual airflow rate using said control algorithm.

15. The plurality of HVAC systems of claim 12, wherein said means for deriving said control algorithm includes means for measuring the actual volumetric airflow throughout the operation range of said first HVAC system component.

16. An HVAC system component to attach to a building's HVAC system and to control the airflow through the HVAC system component, the component comprising:
a housing defining an airflow passage;
an airflow detector adapted to detect a characteristic of the airflow through said airflow passage, said airflow detector attached to said housing and located at a first position in said airflow passage;
an airflow regulator attached to said housing and configured to regulate the airflow through said airflow passage;
a controller in communication with said airflow detector and said airflow regulator, wherein said controller receives input from said airflow detector and calculates a command using a control algorithm adapted to command an actual volumetric airflow calibrated to the HVAC system component with the airflow detector and the airflow regulator attached to the housing, wherein said controller commands said airflow regulator to:
increase airflow through said airflow passage when the actual airflow through said airflow passage is less than a desired airflow, and
decrease airflow through said airflow passage when the actual airflow through said airflow passage is greater than a desired airflow.

17. The HVAC system component of claim 16, wherein the actual volumetric airflow through said airflow passage does not differ more than ten percent (10%) from a desired airflow during operation.

18. The HVAC system component of claim 17, wherein the actual volumetric airflow through said airflow passage does not differ more than five percent (5%) from a desired airflow during operation.

19. The HVAC system component of claim 18, wherein the actual volumetric airflow through said airflow passage does not differ more than three percent (3%) from a desired airflow during operation.

20. The HVAC system component of claim 16, wherein said airflow detector is a pressure sensor.

21. The HVAC system component of claim 16, wherein the airflow at said first position is turbulent.

22. The HVAC system component of claim 16, wherein the airflow through said first airflow passage transitions between laminar and turbulent flow at said first position as the output of said airflow regulator changes between two substantially nonzero airflow rates.

* * * * *